US009419299B2

(12) United States Patent
Visco et al.

(10) Patent No.: US 9,419,299 B2
(45) Date of Patent: *Aug. 16, 2016

(54) BATTERY CELLS WITH LITHIUM ION CONDUCTING TAPE-CAST CERAMIC, GLASS AND GLASS-CERAMIC MEMBRANES

(71) Applicant: PolyPlus Battery Company, Berkeley, CA (US)

(72) Inventors: Steven J. Visco, Berkeley, CA (US); Yevgeniy S. Nimon, Danville, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,672

(22) Filed: Jul. 31, 2015

(65) Prior Publication Data
US 2015/0340720 A1 Nov. 26, 2015

Related U.S. Application Data

(60) Continuation of application No. 13/464,835, filed on May 4, 2012, now Pat. No. 9,136,568, which is a continuation of application No. 13/236,428, filed on Sep. 19, 2011, now Pat. No. 8,202,649, which is a
(Continued)

(51) Int. Cl.
*H01M 2/00* (2006.01)
*H01M 8/10* (2016.01)
(Continued)

(52) U.S. Cl.
CPC ............ *H01M 8/1016* (2013.01); *H01M 4/405* (2013.01); *H01M 6/04* (2013.01);
(Continued)

(58) Field of Classification Search
CPC ......... H01M 10/36; H01M 6/04; H01M 6/34; H01M 10/24; H01M 12/06; H01M 16/00
See application file for complete search history.

(56) References Cited

U.S. PATENT DOCUMENTS 3,528,856 A 9/1970 Ovshinsky
3,607,417 A 9/1971 McRae et al.
(Continued)

FOREIGN PATENT DOCUMENTS

EP 0111213 11/1983
EP 0111214 11/1983
(Continued)

OTHER PUBLICATIONS

International Search Report and Written Opinion dated Oct. 18, 2005 from International Application No. PCT/US2004/033372.
(Continued)

*Primary Examiner* — Cynthia H Kelly
*Assistant Examiner* — Monique Wills
(74) *Attorney, Agent, or Firm* — Weaver Austin Villeneuve & Sampson LLP

(57) ABSTRACT

Alkali (or other active) metal battery and other electrochemical cells incorporating active metal anodes together with aqueous cathode/electrolyte systems. The battery cells have a highly ionically conductive protective membrane adjacent to the alkali metal anode that effectively isolates (de-couples) the alkali metal electrode from solvent, electrolyte processing and/or cathode environments, and at the same time allows ion transport in and out of these environments. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance. In particular, Li/water, Li/air and Li/metal hydride cells, components, configurations and fabrication techniques are provided.

25 Claims, 29 Drawing Sheets

Related U.S. Application Data continuation of application No. 12/649,245, filed on Dec. 29, 2009, now Pat. No. 8,048,571, which is a continuation of application No. 11/824,548, filed on Jun. 29, 2007, now Pat. No. 7,666,233, which is a division of application No. 10/772,157, filed on Feb. 3, 2004, now Pat. No. 7,645,543.

(60) Provisional application No. 60/511,710, filed on Oct. 14, 2003, provisional application No. 60/518,948, filed on Nov. 10, 2003, provisional application No. 60/527,098, filed on Dec. 3, 2003, provisional application No. 60/536,688, filed on Jan. 14, 2004, provisional application No. 60/526,662, filed on Dec. 2, 2003, provisional application No. 60/536,689, filed on Jan. 14, 2004.

(51) Int. Cl.
| | | |
|---|---|---|
| *H01M 10/38* | (2006.01) | |
| *H01M 12/08* | (2006.01) | |
| *H01M 10/0525* | (2010.01) | |
| *H01M 10/0562* | (2010.01) | |
| *H01M 10/058* | (2010.01) | |
| *H01M 4/40* | (2006.01) | |
| *H01M 6/04* | (2006.01) | |
| *H01M 6/34* | (2006.01) | |
| *H01M 10/24* | (2006.01) | |
| *H01M 10/36* | (2010.01) | |
| *H01M 12/06* | (2006.01) | |
| *H01M 16/00* | (2006.01) | |

(52) U.S. Cl.
CPC ............ *H01M 6/34* (2013.01); *H01M 10/058* (2013.01); *H01M 10/0525* (2013.01); *H01M 10/0562* (2013.01); *H01M 10/24* (2013.01); *H01M 10/36* (2013.01); *H01M 10/38* (2013.01); *H01M 12/06* (2013.01); *H01M 12/08* (2013.01); *H01M 16/00* (2013.01); *H01M 2300/0071* (2013.01); *H01M 2300/0094* (2013.01); *Y02E 60/124* (2013.01); *Y02P 70/54* (2015.11); *Y10T 29/4911* (2015.01); *Y10T 29/49108* (2015.01); *Y10T 29/49115* (2015.01)

(56) References Cited

U.S. PATENT DOCUMENTS

| | | | |
|---|---|---|---|
| 3,615,835 A | 10/1971 | Ovshinsky | |
| 3,625,769 A | 12/1971 | Lyall | |
| 3,679,540 A | 7/1972 | Zimmerman et al. | |
| 3,703,415 A | 11/1972 | Mitoff et al. | |
| 3,912,536 A | 10/1975 | Galli et al. | |
| 3,953,566 A | 4/1976 | Gore | |
| 3,966,497 A | 6/1976 | Honer | |
| 3,976,509 A | 8/1976 | Tsai et al. | |
| 4,007,057 A | 2/1977 | Littauer et al. | |
| 4,020,247 A | 4/1977 | Birt et al. | |
| 4,091,182 A | 5/1978 | Farrington et al. | |
| 4,100,238 A | 7/1978 | Shinomura | |
| 4,162,202 A | 7/1979 | Dey | |
| 4,163,084 A | 7/1979 | Tsai et al. | |
| 4,185,143 A | 1/1980 | Birt et al. | |
| 4,187,390 A | 2/1980 | Gore | |
| 4,210,707 A | 7/1980 | Farrington | |
| 4,269,907 A | 5/1981 | Momyer et al. | |
| 4,385,101 A | 5/1983 | Catanzarite | |
| 4,402,995 A | 9/1983 | Fleischer | |
| 4,405,416 A | 9/1983 | Raistrick et al. | |
| 4,414,293 A | 11/1983 | Joy et al. | |
| 4,429,000 A | 1/1984 | Naka et al. | |
| 4,504,561 A | 3/1985 | Winsel | |
| 4,539,256 A | 9/1985 | Shipman | |
| 4,628,420 A | 12/1986 | McArthur | |
| 4,726,989 A | 2/1988 | Mrozinski | |
| 4,735,630 A | 4/1988 | Planchat | |
| 4,828,942 A | 5/1989 | Licht | |
| 4,833,048 A | 5/1989 | De Jonghe et al. | |
| 4,916,036 A | 4/1990 | Cheiky | |
| 4,917,974 A | 4/1990 | Visco et al. | |
| 4,981,672 A | 1/1991 | De Neufville et al. | |
| 4,985,317 A | 1/1991 | Adachi et al. | |
| 5,002,843 A | 3/1991 | Cieslak et al. | |
| 5,035,963 A | 7/1991 | Plichta | |
| 5,100,523 A | 3/1992 | Helms et al. | |
| 5,108,856 A | 4/1992 | Shuster | |
| 5,162,172 A * | 11/1992 | Kaun | H01M 2/08 429/155 |
| 5,162,175 A | 11/1992 | De Jonghe et al. | |
| 5,166,011 A | 11/1992 | Rao et al. | |
| 5,198,081 A | 3/1993 | Kanoh et al. | |
| 5,213,908 A | 5/1993 | Hagedorn | |
| 5,290,592 A | 3/1994 | Izuchi et al. | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,387,479 A | 2/1995 | Koksbang | |
| 5,409,786 A | 4/1995 | Bailey | |
| 5,413,881 A | 5/1995 | Licht et al. | |
| 5,427,873 A | 6/1995 | Shuster | |
| 5,455,126 A | 10/1995 | Bates et al. | |
| 5,506,068 A | 4/1996 | Dan et al. | |
| 5,510,209 A | 4/1996 | Abraham et al. | |
| 5,512,147 A | 4/1996 | Bates et al. | |
| 5,516,598 A | 5/1996 | Chu et al. | |
| 5,523,179 A | 6/1996 | Chu | |
| 5,525,442 A | 6/1996 | Shuster | |
| 5,532,077 A | 7/1996 | Chu | |
| 5,567,210 A | 10/1996 | Bates et al. | |
| 5,569,520 A | 10/1996 | Bates | |
| 5,571,600 A | 11/1996 | Licht | |
| 5,582,623 A | 12/1996 | Chu | |
| 5,597,660 A | 1/1997 | Bates et al. | |
| 5,612,152 A | 3/1997 | Bates | |
| 5,648,183 A | 7/1997 | Licht et al. | |
| 5,648,187 A | 7/1997 | Skotheim | |
| 5,652,068 A | 7/1997 | Shuster et al. | |
| 5,665,481 A | 9/1997 | Shuster et al. | |
| 5,686,201 A | 11/1997 | Chu | |
| 5,693,212 A * | 12/1997 | Mazanec | B01D 53/326 204/260 |
| 5,696,201 A | 12/1997 | Cavalloni et al. | |
| 5,702,995 A | 12/1997 | Fu | |
| 5,789,108 A | 8/1998 | Chu | |
| 5,814,420 A | 9/1998 | Chu | |
| 5,882,812 A | 3/1999 | De Jonghe et al. | |
| 5,961,672 A | 10/1999 | Skotheim et al. | |
| 5,962,171 A | 10/1999 | Boguslavsky et al. | |
| 6,017,651 A | 1/2000 | Chu et al. | |
| 6,025,094 A | 2/2000 | Visco et al. | |
| 6,025,095 A | 2/2000 | Kawamura | |
| 6,030,720 A | 2/2000 | Chu et al. | |
| 6,030,909 A | 2/2000 | Fu | |
| 6,066,417 A | 5/2000 | Cho et al. | |
| 6,068,950 A | 5/2000 | Gan et al. | |
| 6,096,447 A | 8/2000 | Gan et al. | |
| 6,110,236 A | 8/2000 | Chu et al. | |
| 6,146,787 A | 11/2000 | Harrup et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,701 B1 | 3/2001 | Gan et al. | |
| 6,200,704 B1 | 3/2001 | De Jonghe et al. | |
| 6,203,942 B1 | 3/2001 | Gan et al. | |
| 6,203,947 B1 | 3/2001 | Peled et al. | |
| 6,207,324 B1 | 3/2001 | Licht | |
| 6,210,832 B1 | 4/2001 | Chu et al. | |
| 6,214,061 B1 | 4/2001 | Visco et al. | |
| 6,225,002 B1 | 5/2001 | Chu et al. | |
| 6,228,527 B1 | 5/2001 | Medeiros et al. | |

(56) References Cited

U.S. PATENT DOCUMENTS

| | | |
|---|---|---|
| 6,242,135 B1 | 6/2001 | Mushiake |
| 6,248,481 B1 | 6/2001 | Visco et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 | 5/2012 | Visco et al. |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,501,339 B2 | 8/2013 | Visco et al. |
| 8,652,686 B2 | 2/2014 | Visco et al. |
| 8,652,692 B2 | 2/2014 | Visco et al. |
| 8,709,679 B2 | 4/2014 | Visco et al. |
| 8,828,580 B2 | 9/2014 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0015869 A1 | 2/2002 | Suda |
| 2002/0028389 A1 | 3/2002 | Sonoda et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim et al. |
| 2003/0190501 A1 | 10/2003 | Rendina |
| 2003/0224234 A1 | 12/2003 | Steele et al. |
| 2004/0081894 A1 | 4/2004 | Nimon |
| 2004/0101761 A1* | 5/2004 | Park ............... H01B 1/122 429/322 |
| 2004/0126653 A1 | 7/2004 | Visco et al. |
| 2004/0142244 A1 | 7/2004 | Visco et al. |
| 2004/0185334 A1 | 9/2004 | Imamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0051620 A1 | 3/2007 | Visco et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0148533 A1 | 6/2007 | Anglin et al. |
| 2007/0172739 A1 | 7/2007 | Visco et al. |
| 2007/0231704 A1 | 10/2007 | Inda |
| 2007/0259234 A1 | 11/2007 | Chua et al. |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0239152 A1 | 9/2009 | Katoh |
| 2009/0286114 A1 | 11/2009 | Visco et al. |
| 2009/0297935 A1 | 12/2009 | Visco et al. |
| 2010/0104934 A1 | 4/2010 | Visco et al. |
| 2010/0203383 A1 | 8/2010 | Weppner |
| 2010/0203394 A1 | 8/2010 | Bae et al. |
| 2010/0273067 A1 | 10/2010 | Visco et al. |
| 2011/0014522 A1 | 1/2011 | Visco et al. |
| 2011/0039144 A1 | 2/2011 | Visco et al. |
| 2011/0053002 A1 | 3/2011 | Yamamura et al. |
| 2011/0244337 A1 | 10/2011 | Ohta et al. |
| 2011/0269007 A1 | 11/2011 | Visco et al. |
| 2011/0269031 A1 | 11/2011 | Visco et al. |
| 2011/0318648 A1 | 12/2011 | Eitouni et al. |
| 2012/0009469 A1 | 1/2012 | Visco et al. |
| 2012/0094188 A1 | 4/2012 | Visco et al. |
| 2012/0169016 A1 | 7/2012 | Hisano et al. |
| 2012/0219842 A1 | 8/2012 | Visco et al. |
| 2012/0270112 A1 | 10/2012 | Visco et al. |
| 2013/0066025 A1 | 3/2013 | Yang et al. |
| 2013/0273419 A1 | 10/2013 | Pistorino et al. |
| 2014/0004447 A1 | 1/2014 | Visco et al. |
| 2014/0057153 A1 | 2/2014 | Visco et al. |
| 2014/0170465 A1 | 6/2014 | Visco et al. |
| 2014/0335392 A1 | 11/2014 | Visco et al. |
| 2015/0024251 A1 | 1/2015 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1699104 | 9/2006 |
| EP | 1892780 | 2/2008 |
| JP | 55-081471 | 6/1980 |
| JP | 57-003371 | 1/1982 |
| JP | 57-017568 | 1/1982 |
| JP | 57-103271 | 6/1982 |
| JP | 57-172660 | 10/1982 |
| JP | 62-243247 | 10/1987 |
| JP | 63-198261 | 8/1988 |
| JP | 04-275387 | 9/1992 |
| JP | 05-234578 | 9/1993 |

(56) References Cited

FOREIGN PATENT DOCUMENTS

| | | |
|---|---|---|
| JP | 09-320645 | 12/1997 |
| JP | 2001-313025 | 11/2001 |
| JP | 2001-351615 | 12/2001 |
| JP | 2002-513991 | 5/2002 |
| JP | 2002-518796 | 6/2002 |
| JP | 2002-528866 | 9/2002 |
| JP | 2002-289266 | 10/2002 |
| JP | 2003-217662 | 7/2003 |
| JP | 2003-346862 | 12/2003 |
| JP | 2004-504933 | 2/2004 |
| JP | 2005-503920 | 2/2005 |
| KR | 10/2001-0024927 | 3/2001 |
| KR | 2001-0043145 | 5/2001 |
| KR | 10-2002-0059419 | 7/2002 |
| WO | 98/28811 | 7/1998 |
| WO | 99/43034 | 8/1999 |
| WO | 99/57770 | 11/1999 |
| WO | 99/65101 | 12/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |

OTHER PUBLICATIONS

U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, Solid State Ionics.
J.B. Bates, et al., "Thin-film rechargeable lithium batteries," 1995, Journal of Power Sources.
N. J. Dudney, et al., "Sputtering of lithium compounds for preparation of electrolyte thin films," 1992, Solid State Ionics.
J. B. Bates, et al., "Electrical properties of amorphous lithium electrolye thin films," 1992, Solid State Ionics.
Xiaohua Yu, et al, "A Stable Thin-Film Lithium Electrolyte: Lithium Phosphorus Oxynitride," Feb. 1997, J. Electrochem. Soc., vol. 144, No. 2.
Fu, Jie, "Fast Li+ Ion Conduction in Li2O—Al2O3—TiO2—SiO2—P2O5 Glass-Ceramics", Journal of the American Ceramics Society, vol. 80, No. 7, Jul. 1997, pp. 1-5.
Aono et al., "Ionic Conductivity of the Lithium Titanium Phosphate ($Li_{1+X}M_XTi_{2-X}(PO_4)_3$, M=Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta=Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Supertonic conductivity of glass-ceramics in the system $Li_2O—Al_2O_3—TiO_3—P_2O_5$", Solid State Ionics, 96 (1997), pp. 195-200.
Fu, Jie, "Fast Li+ ion conducting glass-ceramics in the system $Li_2O—Al_2O_3—GeO_2—P_2O_5$" Solid State Ionics 104 (1997), pp. 191-194.
Aono, et al., "DC Conductivity of $Li_{1.3}Al_{0.3}Ti_{1.7}(PO_4)_3$ Ceramic with Li Electrodes", Chemistry Letters, 1991, pp. 1567-1570.
Aono, et al., "Electrical Properties of Sintered Lithium Titanium Phosphate Ceramics ($Li_{1+X}M_XTi_{2-X}PO_4)_3$, $M^{3+}=Al^{3+},Sc^{3+}$, or $Y^{3+}$)", Chemistry Letters, 1990, pp. 1825-1828.
Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power-Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of The Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.

(56) References Cited

OTHER PUBLICATIONS

Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., RAPP, $4^{TH}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O—Al_2O_3—TiO_2—P_2O_5$ Glass-Ceramic, *Journal of The Electrochemical Society,* 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the $42^{nd}$ Power Sources Conference, Jun. 2006, p. 2.14.
Read J., "Electrolyte Formulation and Temperature Performance of the $Li/O_2$ Battery", Proceeding of the $9^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
AU patent application No. 2004306866, Notice of Acceptance mailed Jun. 17, 2010.
U.S. Appl. No. 12/649,245, Office Action mailed Jul. 19, 2010.
U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
Thangadurai, Venkataraman et al., "Novel fast lithium ion conduction in garnet-type $Li_5La_3M_2O_{12}$ (M=Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.

(56) References Cited

OTHER PUBLICATIONS

U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/336,459, Office Action mailed Jun. 7, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
Licht et al., "A solid sulfur cathode for aqueous batteries," *Science,* vol. 261, No. 5124 (Aug. 20, 1993) 1029-1032.
Licht et al., "Investigation of a novel aqueous aluminum/sulfur battery," *Journal of Power Sources,* 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
U.S. Appl. No. 13/615,351, Notice of Allowance mailed May 31, 2013.
U.S. Appl. No. 11/562,883, Office Action mailed Jun. 10, 2013.
U.S. Appl. No. 13/708,540, Office Action mailed Jun. 17, 2013.
U.S. Appl. No. 13/464,835, Office Action mailed Aug. 29, 2013.
Choi et al., "Challenges facing lithium batteries and electrical double-layer capacitors," www.angewandte.org Angew. Chem. Int. Ed. 2012, 51, 9994-10024 (31 pages).
Freunberger et al., "Reactions in the rechargeable lithium-$O_2$ battery with alkyl carbonate electrolytes," ACS Publications, J. Am. Chem. Soc. 2011, 133, 8040-8047 (8 pages).
Freunberger et al., "The lithium—oxygen battery with ether-based electrolytes," Wiley Online Library, Angew. Chem. Int. Ed. 2011, 50, 1-6 (6 pages).
CA patent application No. 2,542,304, Notice of Allowance mailed Aug. 18, 2013.
TW patent application No. 097122683, Office Action mailed Aug. 13, 2013.
U.S. Appl. No. 13/673,789, Notice of Allowance mailed Oct. 1, 2013.
U.S. Appl. No. 13/708,540, Office Action mailed Oct. 16, 2013.
U.S. Appl. No. 11/562,883, Notice of Allowance mailed Oct. 17, 2013.
JP patent application No. 2006-552102, Office Action mailed Nov. 26, 2013.
KR patent application No. 2013-078956319, Notice to Submit Response mailed Nov. 18, 2013.
U.S. Appl. No. 13/464,835, Office Action mailed Jan. 16, 2014.
Linden and T.B. Reddy, *Handbook of Batteries,* McGraw-Hill, NY $3^{rd}$ Edition, 2002, p. 38.5.
U.S. Appl. No. 13/717,255, Notice of Allowance mailed Jan. 30, 2014.
WO2009/003695, machine English translation.
WO2013/010692, machine English translation.
BR patent application No. PI0415312.0, Search and Exam Report mailed Mar. 6, 2014.
U.S. Appl. No. 13/708,540, Office Action mailed Apr. 17, 2014.
U.S. Appl. No. 13/708,540, Notice of Allowance mailed May 23, 2014.
U.S. Appl. No. 14/292,699, "Protected lithium electrodes based on ceramic membranes," Visco et al., filed May 30, 2014.
U.S. Appl. No. 13/464,835, Office Action mailed Jun. 3, 2014.
U.S. Appl. No. 13/929,653, Notice of Allowance mailed Jun. 9, 2014.
KR patent application No. 10-2013-7020727, Office Action mailed May 22, 2014.
JP patent application No. 2006-552102, Office Action mailed Jul. 15, 2014.
JP patent application No. 2006-552102, Decision to Grant mailed Aug. 25, 2014.
U.S. Appl. No. 14/449,040, "Protected active metal electrode and battery cell structures with non-aqueous interlayer architecture," Visco et al., filed Jul. 31, 2014.
U.S. Appl. No. 13/464,835, Office Action mailed Jan. 8, 2015.
EP patent application No. 03809186.4, Exam Report mailed Mar. 24, 2015.
U.S. Appl. No. 14/449,040, Office Action mailed May 19, 2015.
U.S. Appl. No. 14/449,040, Notice of Allowance mailed Jul. 1, 2015.
U.S. Appl. No. 13/464,835, Notice of Allowance mailed Jul. 7, 2015.
JP patent application No. 2014-108250, Notification of Reasons for Rejection mailed Jun. 16, 2015.
U.S. Appl. No. 14/156,267, Office Action mailed Nov. 4, 2015.
U.S. Appl. No. 12/973,779, Office Action mailed Dec. 19, 2012.
U.S. Appl. No. 12/973,779, Office Action mailed May 31, 2013.
U.S. Appl. No. 12/973,779, Office Action mailed Nov. 29, 2013.
WO patent application No. PCT/US2011/030969, International Search Report and Written Opinion mailed Jan. 11, 2012.
U.S. Appl. No. 14/156,267, Notice of Allowance mailed Mar. 9, 2016.
U.S. Appl. No. 14/292,699, Notice of Allowance mailed Mar. 14, 2016.
U.S. Appl. No. 14/809,083, Office Action mailed Apr. 4, 2016.
U.S. Appl. No. 14/289,502, Office Action mailed May 13, 2016.

\* cited by examiner

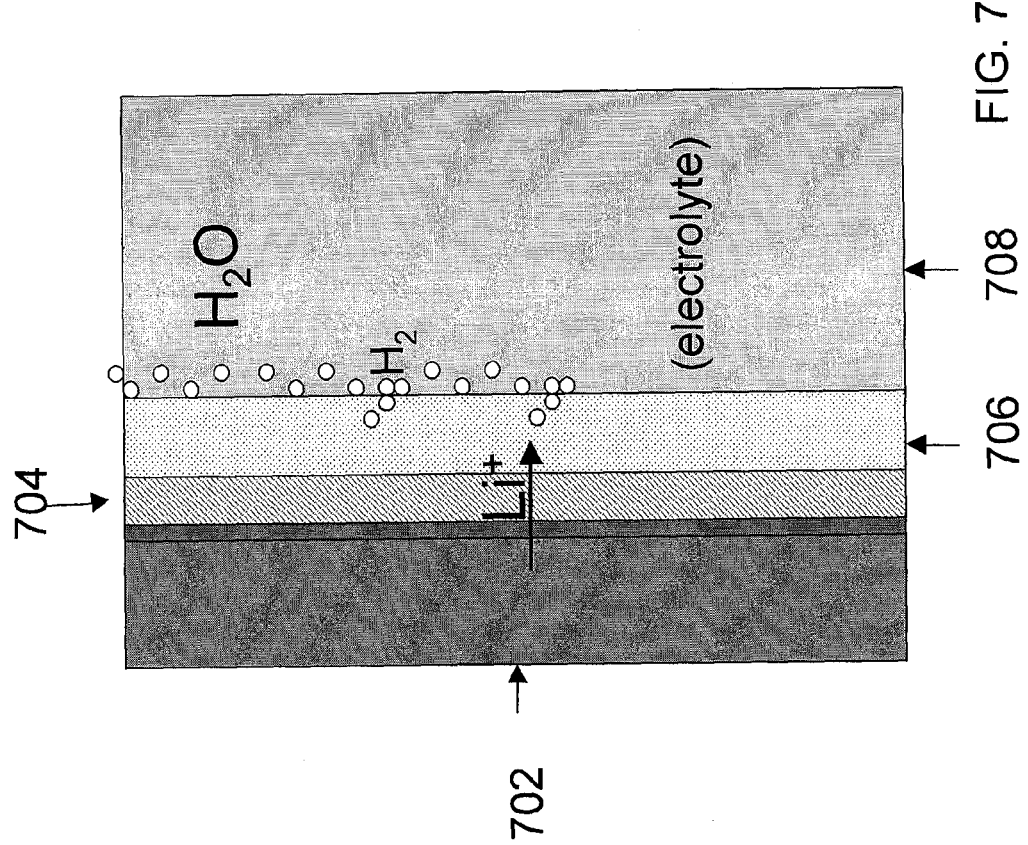

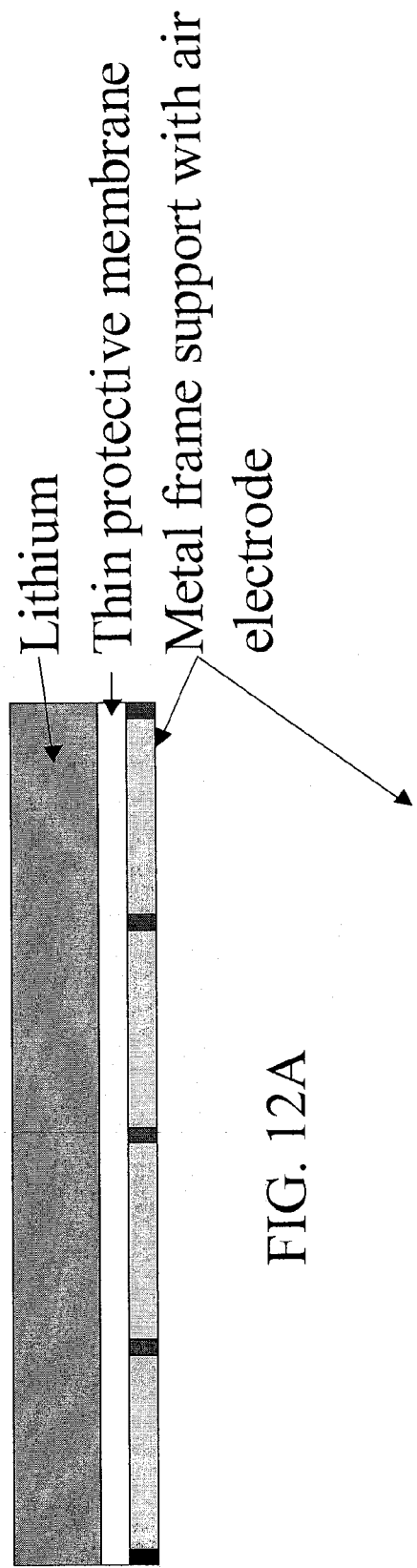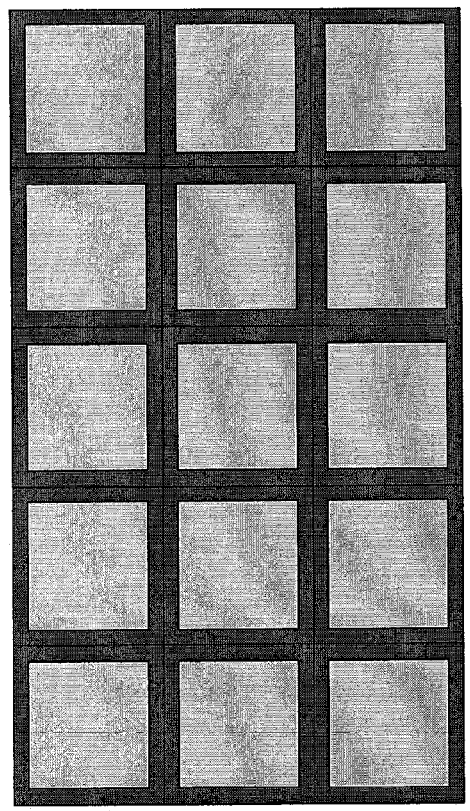
FIG. 12A Side view — Lithium, Thin protective membrane, Metal frame support with air electrode
FIG. 12B Bottom view

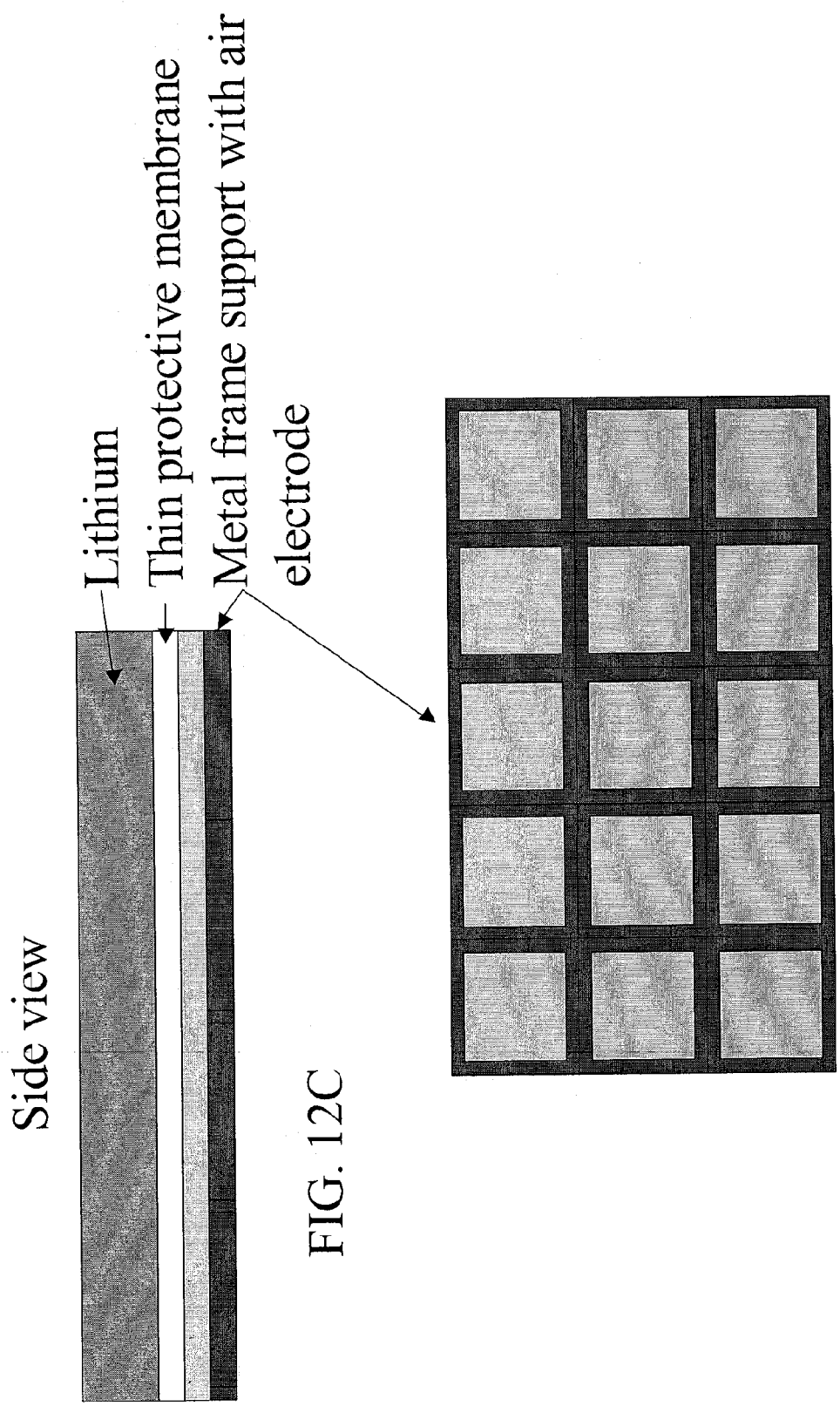

Side view

Li/water or Li/air bilayer structure

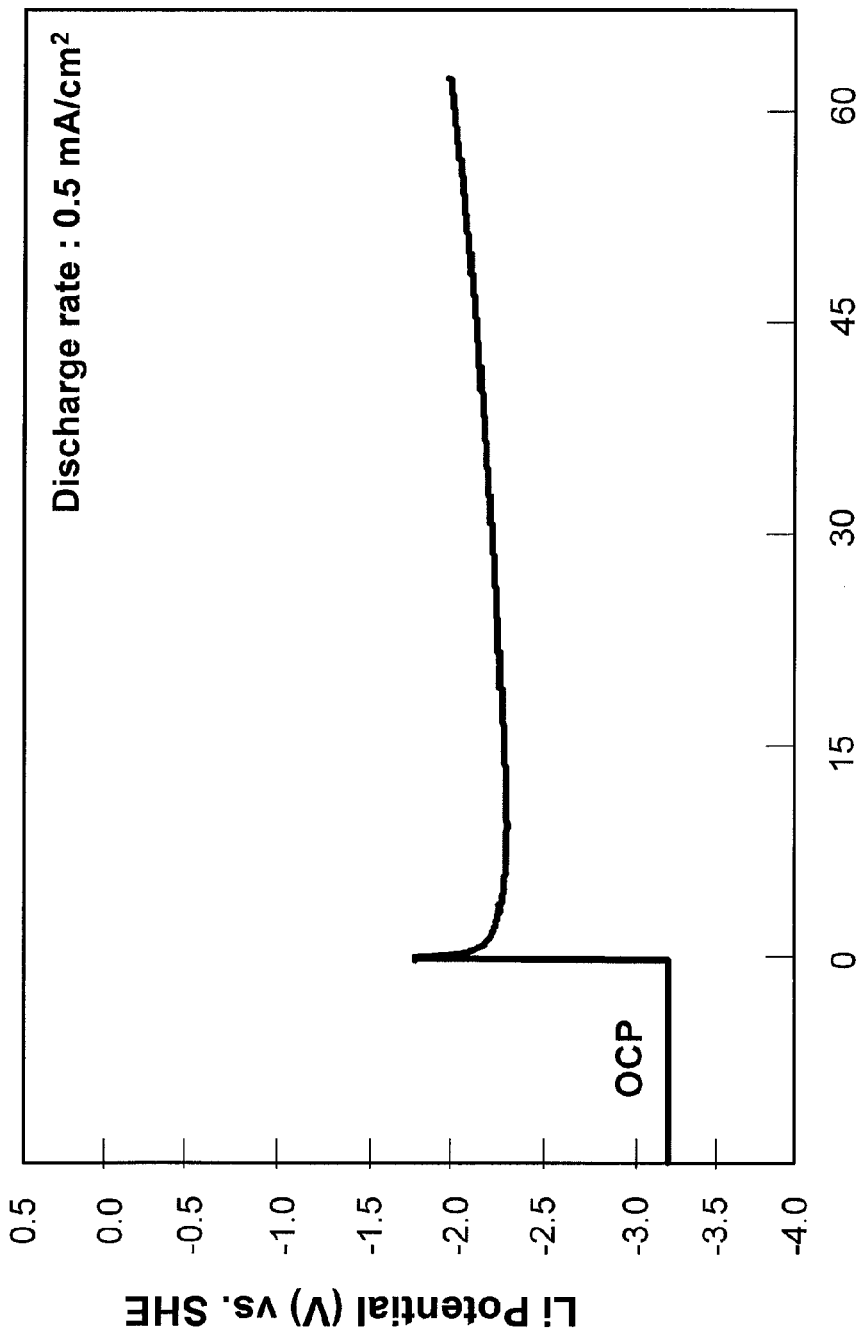

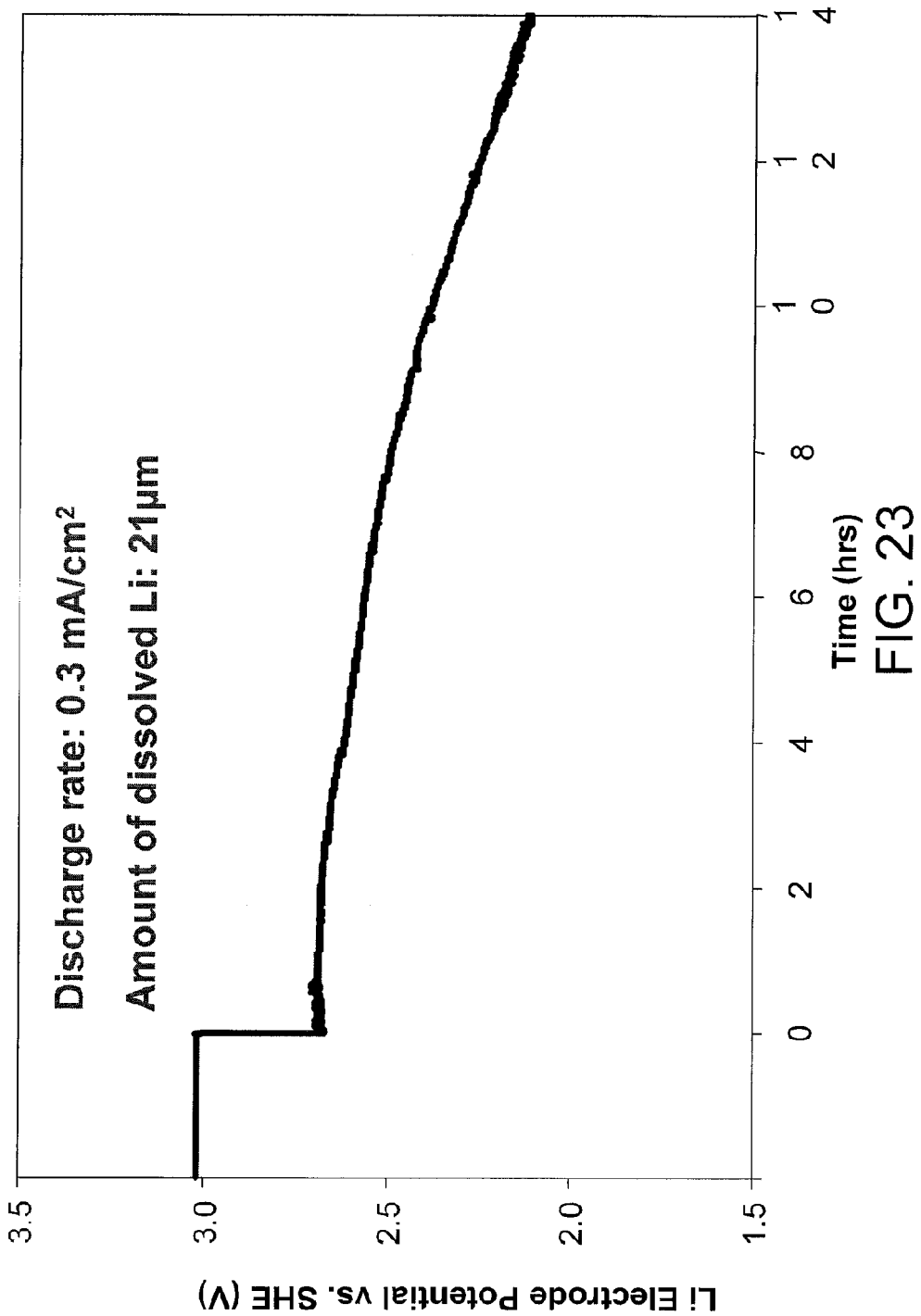

BATTERY CELLS WITH LITHIUM ION CONDUCTING TAPE-CAST CERAMIC, GLASS AND GLASS-CERAMIC MEMBRANES

CROSS-REFERENCE TO RELATED APPLICATIONS

This application is a continuation of U.S. patent application Ser. No. 13/464,835 filed May 4, 2012, titled PROTECTED LITHIUM ELECTRODES HAVING TAPE CAST CERAMIC AND GLASS-CERAMIC MEMBRANES, which is a continuation of U.S. patent application Ser. No. 13/236,428 filed Sep. 19, 2011, titled ACTIVE METAL/AQUEOUS ELECTROCHEMICAL CELLS AND SYSTEMS, now issued as U.S. Pat. No. 8,202,649; which is a continuation of U.S. patent application Ser. No. 12/649,245 filed Dec. 29, 2009, titled ACTIVE METAL/AQUEOUS ELECTROCHEMICAL CELLS AND SYSTEMS, now issued as U.S. Pat. No. 8,048,571; which is a continuation of U.S. patent application Ser. No. 11/824,548 filed Jun. 29, 2007, titled ACTIVE METAL/AQUEOUS ELECTROCHEMICAL CELLS AND SYSTEMS, now issued as U.S. Pat. No. 7,666,233; which is a divisional of U.S. patent application Ser. No. 10/772,157 filed Feb. 3, 2004, titled ACTIVE METAL/AQUEOUS ELECTROCHEMICAL CELLS AND SYSTEMS, now issued as U.S. Pat. No. 7,645,543, which claims priority to U.S. Provisional Patent Application No. 60/511,710 filed Oct. 14, 2003, titled IONICALLY CONDUCTIVE COMPOSITES FOR PROTECTION OF ACTIVE METAL ELECTRODES IN CORROSIVE ENVIRONMENTS; U.S. Provisional Patent Application No. 60/518,948 filed Nov. 10, 2003, titled BI-FUNCTIONALLY COMPATIBLE IONICALLY COMPOSITES FOR ISOLATION OF ACTIVE METAL ELECTRODES IN A VARIETY OF ELECTROCHEMICAL CELLS AND SYSTEMS; U.S. Provisional Patent Application No. 60/527,098 filed Dec. 3, 2003, titled ACTIVE METAL/METAL HYDRIDE BATTERY CELL; U.S. Provisional Patent Application No. 60/536,688 filed Jan. 14, 2004, titled ACTIVE METAL/WATER BATTERY CELLS; U.S. Provisional Patent Application No. 60/526,662 filed Dec. 2, 2003, titled ACTIVE METAL/AIR BATTERY CELL; and U.S. Provisional Patent Application No. 60/536,689 filed Jan. 14, 2004, titled PROTECTED ACTIVE METAL ELECTRODES FOR USE IN ACTIVE METAL/AQUEOUS ELECTROLYTE BATTERY CELLS.

The benefit of each of these prior applications is claimed, and each of these applications is incorporated herein by reference in its entirety and for all purposes.

BACKGROUND OF THE INVENTION

1. Field of the Invention

The present invention relates generally to active metal electrochemical devices. More particularly, this invention relates to active metal/aqueous (e.g., lithium) battery cells made possible by active metal electrode structures having ionically conductive membranes for protection of the active metal from deleterious reaction with air, moisture and other battery cell components, methods for their fabrication and applications for their use.

2. Description of Related Art

The low equivalent weight of alkali metals, such as lithium, render them particularly attractive as a battery electrode component. Lithium provides greater energy per volume than the traditional battery standards, nickel and cadmium. Unfortunately, no rechargeable lithium metal batteries have yet succeeded in the market place.

The failure of rechargeable lithium metal batteries is largely due to cell cycling problems. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits that can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte that contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) that has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all assigned to PolyPlus Battery Company).

Prior attempts to use lithium anodes in aqueous environments relied either on the use of very basic conditions such as use of concentrated aqueous KOH to slow down the corrosion of the Li electrode, or on the use of polymeric coatings on the Li electrode to impede the diffusion of water to the Li electrode surface; in all cases however, there was substantial reaction of the alkali metal electrode with water. In this regard, the prior art teaches that the use of a aqueous cathodes or electrolytes with Li-metal anodes is not possible since the breakdown voltage for water is about 1.2 V and a Li/water cell can have a voltage of about 3.0 V. Direct contact between lithium metal and aqueous solutions results in violent parasitic chemical reaction and corrosion of the lithium electrode for no useful purpose. Thus, the focus of research in the lithium metal battery field has been squarely on the development of effective non-aqueous (mostly organic) electrolyte systems.

SUMMARY OF THE INVENTION

The present invention concerns alkali (or other active) metal battery cells and electrochemical cells incorporating them together with aqueous cathode/electrolyte systems. The battery cell negative electrode (anode) has a highly ionically conductive (at least about $10^{-7}$ S/cm, and more preferably at least $10^{-6}$ S/cm, for example $10^{-5}$ S/cm to $10^{-4}$ S/cm, and as high as $10^{-3}$ S/cm or higher) protective membrane adjacent to the alkali metal anode that effectively isolates (de-couples) the alkali metal electrode from solvent, electrolyte processing and/or cathode environments, including such environments that are normally highly corrosive to Li or other active metals, and at the same time allows ion transport in and out of these potentially corrosive environments. The protective membrane is thus chemically compatible with active metal (e.g., lithium) on one side and a wide array of materials, including those that are normally highly corrosive to Li or other active metals on the other side, while at the same time allowing ion transport from one side to the other. In this way, a great degree of flexibility is permitted the other components of an electrochemical device, such as a battery cell, made with the protected active metal electrodes. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

Such a protected active metal anode may be used with a wide array of solvents, electrolytes and cathode materials (including those more stable in lithium metal systems, such as are used in lithium-sulfur battery systems described in the patents of PolyPlus Battery Company, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002 and U.S. patent application Ser. No. 10/686,189, filed Oct. 14, 2003, each of which is incorporated by reference herein in its entirety for all purposes); and more Li-corrosive materials including air, ionic (including protic) solutions, aqueous electrolytes, molten salts, and ionic liquids, for example, operating conditions (including high through low temperatures) and discharge rate regimes (including high through low discharge rates). Li anode corrosion is not an issue and the electrolyte compatibility with the anode is not a concern. A few examples of desirable battery cells in accordance with the present invention include Li-air; Li-aqueous electrolyte; and Li-sea/salt water. Other novel and useful electrochemical devices are also rendered possible in accordance with the present invention, as described further below. The use of cathode materials extremely reactive with Li is also possible by using protective composites in accordance with the present invention, for example $PbSnF_4$ and the like, for Li/F batteries.

The present invention uses ionically conductive membranes for decoupling the active metal anode and cathode sides of an active metal electrochemical cell. The membranes may be incorporated in active metal negative electrode (anode) structures and electrochemical devices and components, including batteries and fuel cells. The membranes are highly conductive for ions of the active metal, but are otherwise substantially impervious. They are chemically stable on one side to the active metal of the anode (e.g., lithium), and on the other side to the cathode, other battery cell components such as solid or liquid phase electrolytes, including organic or aqueous liquid electrolytes, and preferably to ambient conditions. The membrane is capable of protecting an active metal anode from deleterious reaction with other battery components or ambient conditions and decoupling the chemical environments of the anode and cathode enabling use of anode-incompatible materials, such as solvents and electrolytes, on the cathode side without deleterious impact on the anode, and vice versa. This broadens the array of materials that may be used in active metal electrochemical cells and facilitates cell fabrication while providing a high level of ionic conductivity to enhance performance of an electrochemical cell in which the membrane is incorporated.

It is widely known that lithium metal reacts violently with water, and even more violently with aqueous acidic solutions. However, it has been found that a cell composed of a lithium electrode protected with a LiPON (Ag)/OHARA glass-ceramic composite in accordance with the present invention, as described above, can be immersed into acidic aqueous electrolytes without incident. The thermodynamic open circuit potential is observed vs. a Ag/AgCl reference and a normal hydrogen electrode and lithium can be discharged into the aqueous electrolyte causing hydrogen evolution to occur at a Pt counter electrode, with no evidence of corrosion or chemical reaction at the lithium electrode. It has been further shown that such a protected lithium electrode can be immersed into an aqueous bath having dissolved LiOH, and the lithium electrode can be reversibly cycled in such an aqueous electrolyte. Prior experiments showing these results are unknown, as corrosion of metallic lithium in aqueous environments is known to rapidly occur. This discovery enables a number of unique battery systems to be developed, including Li/water and Li/air batteries. These systems have been attempted previously using unprotected lithium metal electrodes. However, due to the rapid corrosion of unprotected lithium metal electrodes in water, batteries formed using such electrodes would have very short life, and have limited commercial appeal due to safety problems. With the current invention, the protected lithium electrode shows no evidence of corrosion/chemical reaction with aqueous electrolytes, and results in batteries that should have wide commercial appeal.

In various aspects, the invention relates to an active metal/aqueous battery cell. The battery cell includes an active metal anode having a first surface and a second surface; a cathode structure with an electronically conductive component, an ionically conductive component, and an electrochemically active component. At least one cathode structure component comprises an aqueous constituent. An ionically conductive protective membrane is disposed on the first surface of the anode, the membrane having one or more materials configured to provide a first surface chemically compatible with the active metal of the anode in contact with the anode, and a second surface substantially impervious to and chemically compatible with the cathode structure and in contact with the cathode structure.

Exemplary cells in accordance with the present invention include Li/water, Li/air and Li/metal hydride batter cells and other electrochemical cells.

The invention also provides a variety of cell and component fabrication techniques, cell components and configurations.

These and other features of the invention are further described and exemplified in the detailed description below.

BRIEF DESCRIPTION OF THE DRAWINGS

FIG. 7 illustrates a specific implementation of a lithium/water battery cell in accordance with the present invention.

FIGS. 12A-E illustrate a technique for fabricating thin glass or glass-ceramic protective membranes attached to an electronically conductive porous support suitable for use in active metal/aqueous cells in accordance with one embodiment of the present invention.

FIGS. 17-27 are plots of data illustrating the performance of various cells incorporating anodes with ionically conductive protective membranes and aqueous-containing cathodes in accordance with the present invention.

DETAILED DESCRIPTION OF SPECIFIC EMBODIMENTS

Figures 1, 2A, 2B:
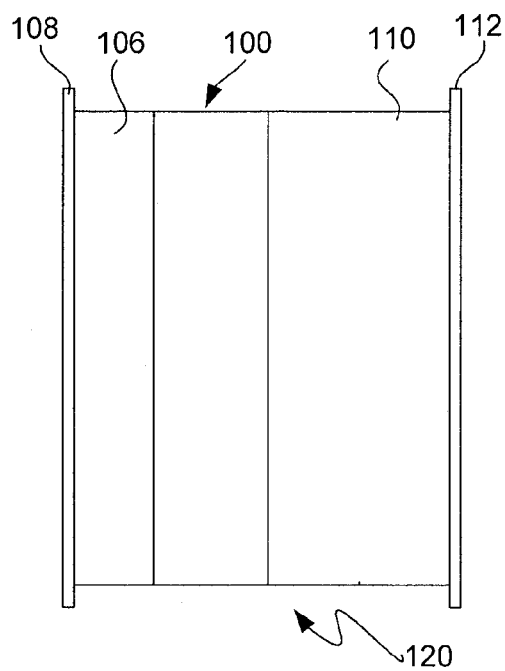
FIG. 1 is a schematic illustration of an active metal battery cell incorporating an ionically conductive protective membrane in accordance with the present invention.
FIGS. 2A and B are a schematic illustrations of ionically conductive protective membrane battery separators in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

The present invention concerns alkali (or other active) metal battery cells and electrochemical cells incorporating them together with aqueous cathode/electrolyte systems. The battery cell negative electrode (anode) has a highly ionically conductive (at least about $10^{-7}$ S/cm, and more preferably at least $10^{-6}$ S/cm, for example $10^{-5}$ S/cm to $10^{-4}$ S/cm, and as high as $10^{-3}$ S/cm or higher) protective membrane adjacent to the alkali metal anode that effectively isolates (de-couples) the alkali metal electrode from solvent, electrolyte processing and/or cathode environments, including such environments that are normally highly corrosive to Li or other active metals, and at the same time allows ion transport in and out of these potentially corrosive environments. The protective membrane is thus chemically compatible with active metal (e.g., lithium) on one side and a wide array of materials, including those including those that are normally highly corrosive to Li or other active metals on the other side, while at the same time allowing ion transport from one side to the other. In this way, a great degree of flexibility is permitted the other components of an electrochemical device, such as a battery cell, made with the protected active metal electrodes. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

Such a protected active metal anode may be used with a wide array of solvents, electrolytes and cathode materials (including those more stable in lithium metal systems, such as are used in lithium-sulfur battery systems described in the patents of PolyPlus Battery Company, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, and U.S. patent application Ser. No. 10/686,189, filed Oct. 14, 2003, each of which is incorporated by reference herein in its entirety for all purposes); and more Li-corrosive materials including air, ionic (including protic) solutions, aqueous electrolytes, molten salts, and ionic liquids, for example), operating conditions (including high through low temperatures) and discharge rate regimes (including high through low discharge rates). Li anode corrosion is not an issue and the electrolyte compatibility with the anode is not a concern. A few examples of desirable battery cells in accordance with the present invention include Li-air; Li-aqueous electrolyte; and Li-sea/salt water. Other novel and useful electrochemical devices are also rendered possible in accordance with the present invention, as described further below. The use of cathode materials extremely reactive with Li is also possible by using protective composites in accordance with the present invention, for example $PbSnF_4$ and the like, for Li/F batteries.

The present invention uses ionically conductive membranes for decoupling the active metal anode and cathode sides of an active metal electrochemical cell. The membranes may be incorporated in active metal negative electrode (anode) structures and electrochemical devices and components, including battery and fuel cells. The membranes are highly conductive for ions of the active metal, but are otherwise substantially impervious. They are chemically stable on one side to the active metal of the anode (e.g., lithium), and on the other side to the cathode, other battery cell components such as solid or liquid phase electrolytes, including organic or aqueous liquid electrolytes, and preferably to ambient conditions. The membrane is capable of protecting an active metal anode from deleterious reaction with other battery components or ambient conditions and decoupling the chemical environments of the anode and cathode enabling use of anode-incompatible materials, such as solvents and electrolytes, on the cathode side without deleterious impact on the anode, and vice versa. This broadens the array of materials that may be used in active metal electrochemical cells and facilitates cell fabrication while providing a high level of ionic conductivity to enhance performance of an electrochemical cell in which the membrane is incorporated.

The membrane may have any suitable composition, for example, it may be a monolithic material chemically compatible with both the anode and cathode environments, or a composite composed of at least two components of different materials having different chemical compatibilities, one chemically compatible with the anode environment and the other chemically compatible with the cathode environment.

Composite membranes may be composed of at least two components of different materials having different chemical compatibility requirements. The composite may be composed of a laminate of discrete layers of materials having different chemical compatibility requirements, or it may be composed of a gradual transition between layers of the materials. By "chemical compatibility" (or "chemically compatible") it is meant that the referenced material does not react to form a product that is deleterious to battery cell operation when contacted with one or more other referenced battery cell components or manufacturing, handling or storage conditions.

A first material layer of the composite is both ionically conductive and chemically compatible with an active metal electrode material. Chemical compatibility in this aspect of the invention refers to a material that is chemically stable and therefore substantially unreactive when contacted with an active metal electrode material. Active metals are highly reactive in ambient conditions and can benefit from a barrier layer when used as electrodes. They are generally alkali metals such (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium. Chemical compatibility also refers to a material that may be chemically stable with oxidizing materials and reactive when contacted with an active metal electrode material to produce a product that is chemically stable against the active metal electrode material and has the desirable ionic conductivity (i.e., a first layer material). Such a reactive material is sometimes referred to as a "precursor" material.

A second material layer of the composite is substantially impervious, ionically conductive and chemically compatible with the first material. By substantially impervious it is meant that the material provides a sufficient barrier to battery electrolytes and solvents and other battery component materials that would be damaging to the electrode material to prevent any such damage that would degrade electrode performance from occurring. Thus, it should be non-swellable and free of pores, defects, and any pathways allowing air, moisture, electrolyte, etc. to penetrate though it to the first material. Preferably, the second material layer is so impervious to ambient moisture, carbon dioxide, oxygen, etc. that an encapsulated lithium alloy electrode can be handled under ambient conditions without the need for elaborate dry box conditions as typically employed to process other lithium electrodes. Because the composite protective layer described herein provides such good protection for the lithium (or other active metal), it is contemplated that electrodes and electrode/electrolyte composites of this invention may have a quite long shelf life outside of a battery. Thus, the invention contemplates not only batteries containing a negative electrode, but unused negative electrodes and electrode/electrolyte laminates themselves. Such negative electrodes and electrode/electrolyte laminates may be provided in the form of sheets, rolls, stacks, etc. Ultimately, they may be integrated with other battery components to fabricate a battery. The enhanced stability of the batteries of this invention will greatly simplify this fabrication procedure.

In addition to the protective composite laminate structure described above, a protective composite in accordance with the present invention may alternatively be a functionally graded layer, as further described below.

It should be noted that the first and second materials are inherently ionically conductive. That is, they do not depend on the presence of a liquid electrolyte or other agent for their ionically conductive properties.

Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Protective Membranes and Structures

FIG. 1 is a conceptual illustration of an ionically conductive protective membrane in accordance with the present invention in context as it would be used in an active metal/aqueous battery cell 120, such as a lithium/water, lithium/air or lithium/metal hydride battery cell, in accordance with the present invention. The membrane 100 is both ionically conductive and chemically compatible with an active metal (e.g., lithium) electrode (anode) 106 on one side, and substantially impervious, ionically conductive and chemically compatible with a cathode structure 110 having an electronically conductive component, an ionically conductive component, and an electrochemically active component, with at least one cathode structure component being or including an aqueous constituent. The ionic conductivity of the membrane is at least $10^{-7}$ S/cm, generally at least $10^{-6}$ S/cm, for example at least $10^{-5}$ S/cm to $10^{-4}$ S/cm, and as high as $10^{-3}$ S/cm or higher. The active metal anode 106 in contact with the first side of the protective membrane is connected with a current collector 108 composed of a conductive metal, such as copper, that is generally inert to and does not alloy with the active metal. The electronically conductive component, for example in Li/water and Li/air cells, a porous catalytic electronically conductive support, not shown in this conceptual depiction, is generally provided adjacent to the protective membrane on the cathode, provides electron transport from the anode (via a cathode current collector 112) and facilitates electroreduction of the cathode active material.

The protective membrane may be a composite composed of two or more materials that present sides having different chemical compatibility to the anode and electrolyte and/or cathode, respectively. The composite is composed of a first layer of a material that is both ionically conductive and chemically compatible with an active metal electrode material. The composite also includes second layer of a material that is substantially impervious, ionically conductive and chemically compatible with the first material and the cathode/electrolyte environment.

As described further below, given the protection afforded by the protective membranes of the present invention, the electrolytes and/or cathodes combined with the protected anodes of the present invention may include a wide variety of materials including, but not limited to, those described in the patents of PolyPlus Battery Company, referenced herein below.

FIG. 2A illustrates a protective membrane composite battery separator in accordance with one embodiment of the present invention. The separator 200 includes a laminate of discrete layers of materials with different chemical compatibilities. A layer of a first material or precursor 202 is ionically conductive and chemically compatible with an active metal. In most cases, the first material is not chemically compatible with oxidizing materials (e.g., air, moisture, etc). The first layer, in contact with the active metal, may be composed, in whole or in part, of active metal nitrides, active metal phosphides, active metal halides or active metal phosphorus oxynitride-based glasses. Specific examples include $Li_3N$, $Li_3P$, LiI, LiBr, LiCl and LiF. In at least one instance, LiPON, the first material is chemically compatible with oxidizing materials. The thickness of the first material layer is preferably about 0.1 to 5 microns, or 0.2 to 1 micron, for example about 0.25 micron.

As noted above, the first material may also be a precursor material which is chemically compatible with an active metal and reactive when contacted with an active metal electrode material to produce a product that is chemically stable against the active metal electrode material and has the desirable ionic conductivity (i.e., a first layer material). Examples of suitable precursor materials include metal nitrides, red phosphorus, nitrogen and phosphorus containing organics (e.g., amines, phosphines, borazine $(B_3N_3H_6)$, triazine $(C_3N_3H_3)$) and halides. Some specific examples include P (red phosphorus), $Cu_3N$, $SnN_x$, $Zn_3N_2$, $FeN_x$, $CoN_x$, aluminum nitride ($Al_3N$), silicon nitride ($Si_3N_4$) and $I_2$, $Br_2$, $Cl_2$ and $F_2$. Such precursor materials can subsequently react with active metal (e.g., Li) to form Li metal salts, such as the lithium nitrides, phosphides and halides described above. In some instances, these first layer material precursors may also be chemically stable in air (including moisture and other materials normally present in ambient atmosphere), thus facilitating handling and fabrication. Examples include metal nitrides, for example $Cu_3N$.

Also, a suitable active metal compatible layer may include a polymer component to enhance its properties. For example, polymer-iodine complexes like poly(2-vinylpyridine)-iodine (P2VP-$I_2$), polyethylene-iodine, or with tetraalkylammonium-iodine complexes can react with Li to form a LiI-based film having significantly higher ionic conductivity than that for pure LiI.

The ionic conductivity of the first material is high, at least $10^{-7}$ S/cm, generally at least about $10^{-5}$ S/cm, and may be as high as $10^{-3}$ S/cm or higher.

Adjacent to the first material or precursor layer 202 is a second layer 204 that is substantially impervious, ionically conductive and chemically compatible with the first material or precursor and environments normally corrosive to the active metal of the anode, including glassy or amorphous metal ion conductors, such as a phosphorus-based glass, oxide-based glass, phosphorus-oxynitride-based glass, sulphur-based glass, oxide/sulfide based glass, selenide based glass, gallium based glass, germanium-based glass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x}Ti_{2-x}Al_x(PO_4)_3$ ($0.6 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
|---|---|
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where $X \leq 0.8$ and $0 \leq Y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0<X \leq 0.4$ and $0<Y \leq 0.6$, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

The high conductivity of some of these glasses, ceramics and glass-ceramics (ionic conductivity in the range of about $10^{-7}$ to $10^{-3}$ S/cm or greater) may enhance performance of the protected lithium anode, and allow relatively thick films to be deposited without a large penalty in terms of ohmic resistance.

Either layer may also include additional components. For instance, a suitable active metal compatible layer (first layer) may include a polymer component to enhance its properties. For example, polymer-iodine complexes like poly(2-vinylpyridine)-iodine (P2VP-$I_2$), polyethylene-iodine, or tetraalkylammonium-iodine complexes can react with Li to form a LiI-based film having significantly higher ionic conductivity than that for pure LiI. Also, a suitable first layer may include a material used to facilitate its use, for example, the residue of a thin wetting layer (e.g., Ag) used to prevent reaction between vapor phase lithium (during deposition) and LiPON when LiPON is used as a first layer material.

In addition, the layers may be formed using a variety of techniques. These include deposition or evaporation (including e-beam evaporation) or thermal spray techniques such as plasma spray of layers of material, such as $Li_3N$ or an ionically conductive glass (e.g., LiPON). Also, as noted above, the active metal electrode adjacent layer may be formed in situ from the non-deleterious reaction of one or more precursors with the active metal electrode. For example, a $Li_3N$ layer may be formed on a Li anode by contacting $Cu_3N$ with the Li anode surface, or $Li_3P$ may be formed on a Li anode by contacting red phosphorus with the Li anode surface.

Such compositions, components and methods for their fabrication are described in U.S. Provisional Patent Application No. 60/418,899, filed Oct. 15, 2002, titled IONICALLY CONDUCTIVE COMPOSITES FOR PROTECTION OF ANODES AND ELECTROLYTES, its corresponding U.S. patent application Ser. No. 10/686,189, filed Oct. 14, 2003, and titled IONICALLY CONDUCTIVE COMPOSITES FOR PROTECTION OF ACTIVE METAL ANODES, and U.S. patent application Ser. No. 10/731,771, filed Dec. 5, 2003, and titled IONICALLY CONDUCTIVE COMPOSITES FOR PROTECTION OF ACTIVE METAL ANODES. These applications are incorporated by reference herein in their entirety for all purposes.

The composite barrier layer should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode with which the separator is to be used. For example, the first material layer may have a thickness of about 0.1 to 5 microns; 0.2 to 1 micron; or about 0.25 micron.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example 20 microns.

When the first material layer is a precursor material chemically stable in air, for example $Cu_3N$ or LiPON, the protective composite battery separator may be handled or stored in normal ambient atmospheric conditions without degradation prior to incorporation into a battery cell. When the separator is incorporated into a battery cell, the precursor layer 202 is contacted with an active metal (e.g., lithium) electrode. The precursor reacts with the active metal to form an ionically conductive material that is chemically compatible with the active metal electrode material. The second layer is contacted with an electrolyte to which a cathode and current collector is or has been applied. Alternatively, the second layer acts as the sole electrolyte in the battery cell. In either case, the combination of the two layers in the protective composite protects the active metal electrode and the electrolyte and/or cathode from deleterious reaction with one another.

In addition to the protective composite laminates described above, a protective composite in accordance with the present invention may alternatively be compositionally and functionally graded, as illustrated in FIG. 2B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 220 stable on one side 214 to lithium or other active metal (first material), and on the other side 216 substantially impervious and stable to ambient conditions, and ultimately, when incorporated into a battery cell, to the cathode, other battery cell components (second material). In this embodiment, the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of a glass-ceramic such as described herein). The transition between materials may occur over any (e.g., relatively short, long or intermediate) distance in the composite. Other aspects of the invention apply to these graded protective composites substantially as to the discrete-layered laminate protective composites, for example, they may be used in the electrode and cell embodiments, etc.

Figure 3A:
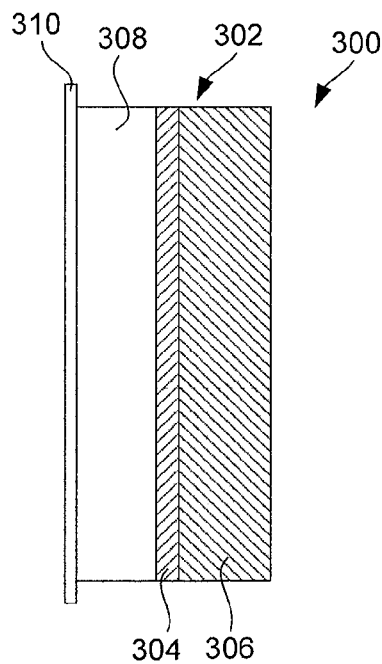
FIG. 3A is a schematic illustration of an active metal anode structure incorporating an ionically conductive protective laminate composite membrane in accordance with the present invention.

FIG. 3A illustrates an encapsulated anode structure incorporating a protective laminate composite in accordance with the present invention. The structure 300 includes an active metal electrode 308, e.g., lithium, bonded with a current collector 310, e.g., copper, and a protective composite 302. The protective composite 302 is composed of a first layer 304 of a material that is both ionically conductive and chemically compatible with an active metal electrode material, but not chemically compatible with electrolyte or oxidizing materials (e.g., air). For example, the first layer, in contact with the active metal, may be composed, in whole or in part, of active metal nitrides, active metal phosphides or active metal halides. Specific examples include $Li_3N$, $Li_3P$, LiI, LiBr, LiCl and LiF. The thickness of the first material layer is preferably about 0.1 to 5 microns, or 0.2 to 1 micron, for example about 0.25 micron.

Active metal electrode materials (e.g., lithium) may be applied to these materials, or they may be formed in situ by contacting precursors such as metal nitrides, metal phosphides, metal halides, red phosphorus, iodine and the like with lithium. The in situ formation of the first layer may be by way of conversion of the precursors to a lithiated analog, for example, according to reactions of the following type (using P, $Cu_3N$, and $PbI_2$ precursors as examples):

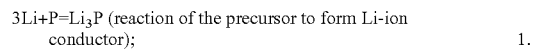
$$3Li+P=Li_3P \text{ (reaction of the precursor to form Li-ion conductor);} \qquad 1.$$

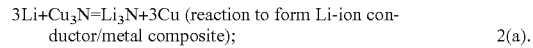
$$3Li+Cu_3N=Li_3N+3Cu \text{ (reaction to form Li-ion conductor/metal composite);} \qquad 2(a).$$

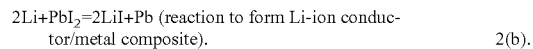
$$2Li+PbI_2=2LiI+Pb \text{ (reaction to form Li-ion conductor/metal composite).} \qquad 2(b).$$

First layer composites, which may include electronically conductive metal particles, formed as a result of in situ conversions meet the requirements of a first layer material for a protective composite in accordance with the present invention and are therefore within the scope of the invention.

A second layer 306 of the protective composite is composed of a substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass or boracite glass; ceramic active metal ion conductors, such as lithium beta-alumina, sodium beta-alumina, Li superionic conductor (LISICON), Na superionic conductor (NASICON), and the like; or glass-ceramic active metal ion conductors. Specific examples include LiPON, $Li_3PO_4.Li_2S.SiS_2$, $Li_2S.GeS_2.Ga_2S_3$, $Li_2.11Al_2O_3$, $Na_2O.11Al_2O_3$, $(Na, Li)_{1+x}Ti_{2-x}Al_x(PO_4)_3$ $(0.6 \leq x \leq 0.9)$ and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes. Suitable glass-ceramic ion active metal ion conductors are described, for example, in U.S. Pat. Nos. 5,702,995, 6,030,909, 6,315,881 and 6,485,622, previously incorporated herein by reference and are available from OHARA Corporation, Japan.

The ionic conductivity of the composite is at least $10^{-7}$ S/cm, generally at least $10^{-6}$ S/cm, for example at least $10^{-5}$ S/cm to $10^{-4}$ S/cm, and as high as $10^{-3}$ S/cm or higher. The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, 10 to 1000 microns, preferably between 1 and 500 micron, and more preferably between 10 and 100 microns, for example 20 microns.

When the anode structure is incorporated in a battery cell with a water or air cathode, the first layer 304 is adjacent to an active metal (e.g., lithium) anode and the second layer 306 is adjacent to cathode material and its associated aqueous electrolyte. As further described below, such battery cells also generally include a porous catalytic electronically conductive support structure to facilitate the cathodic reaction in the cell.

Figure 3B:
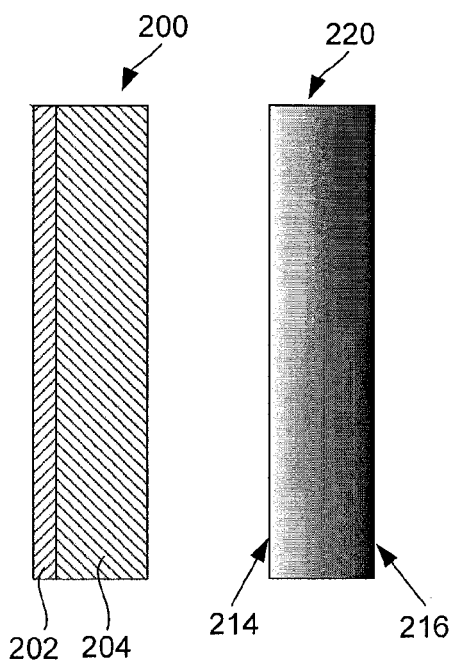
FIG. 3B is a schematic illustration of an active metal anode structure incorporating an ionically conductive protective graded composite membrane in accordance with the present invention.

As noted above with regard to the protective membrane separator structures described in connection with FIGS. 2A and B, in addition to the protective composite laminates described above, a protective composite in accordance with the present invention may alternatively be compositionally and functionally graded, as illustrated in FIG. 3B. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer composites described above, is a bi-functionally compatible ionically conductive composite 320 stable on one side 314 to lithium or other active metal (first material), and on the other side 316 substantially impervious and stable to the cathode, other battery cell components and preferably to ambient atmosphere (second material).

As noted with reference to the graded separator in FIG. 2B, in this embodiment the proportion of the first material to the second material in the composite may vary widely based on ionic conductivity and mechanical strength issues, for example. In many, but not all, embodiments the second material will dominate. For example, suitable ratios of first to second materials may be 1-1000 or 1-500, for example about 1 to 200 where the second material has greater strength and ionic conductivity than the first (e.g., 2000 Å of LiPON and 20-30 microns of a glass-ceramic such as described herein). The transition between materials may occur over any (e.g., relatively short, long or intermediate) distance in the composite.

Also, an approach may be used where a first material and second material are coated with another material such as a transient and/or wetting layer. For example, a glass-ceramic plate such as described herein (e.g. from OHARA Corp.) is coated with a LiPON layer, followed by a thin silver (Ag) coating. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely reaction with the LiPON first material layer. After deposition, the solid phase lithium is stable against the LiPON. A multitude of such transient/wetting (e.g., Sn) and first layer material combinations can be used to achieve the desired result.

A protective membrane in accordance with the present invention may be formed using a variety of methods. These include deposition or evaporation. Protective membrane composites of the present invention may be formed by deposition or evaporation (including e-beam evaporation) of the first layer of material or precursor on the second layer of material. Also, as noted above and described further below, the first layer may be formed in situ from the non-deleterious reaction of one or more precursors with an active metal electrode or material, by deposition or evaporation of lithium on the precursor, by direct contact of the precursor with a lithium metal (e.g., foil), or by plating of the precursor with lithium through a second layer material. In some embodiments, the second layer material may also be formed on the first layer material, as described further below.

Figure 4A:
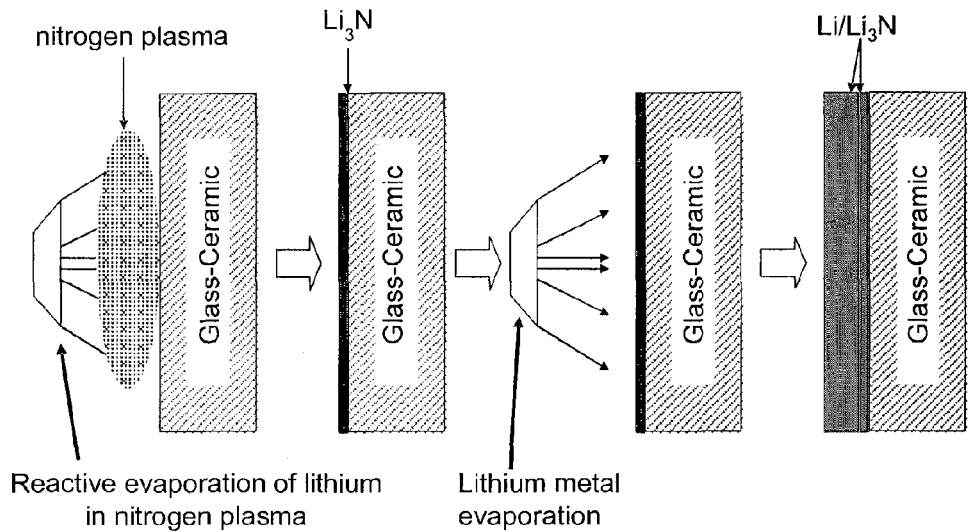
FIGS. 4A-B, 5 and 6A-B are schematic illustrations of alternative methods of making an electrochemical device structure incorporating an ionically conductive protective membrane in accordance with the present invention.

Referring to FIG. 4A, a first method for forming a protective membrane composite in accordance with the present invention is shown. A first layer, that is a highly ionically conductive active metal chemically compatible material, is directly deposited onto a second layer material, that is a substantially impervious, ionically conductive material, for example, a highly ionically conductive glass or glass-ceramic material such as LiPON or a glass-ceramic material described above. This can be done by a variety of techniques including RF sputtering, e-beam evaporation, thermal evaporation, or reactive thermal or e-beam evaporation, for example. In the particular example illustrated in the figure, lithium is evaporated in a nitrogen plasma to form a lithium nitride ($Li_3N$) layer on the surface of a glass-ceramic material such as the glass-ceramic material described above. This is followed by evaporation of lithium metal onto the $Li_3N$ film. The $Li_3N$ layer separates the lithium metal electrode from the second material layer, but allows Li ions to pass from the Li electrode through the glass. Of course, other active metal, and first and second layer materials, as described herein, may be used as well.

Figure 4B:
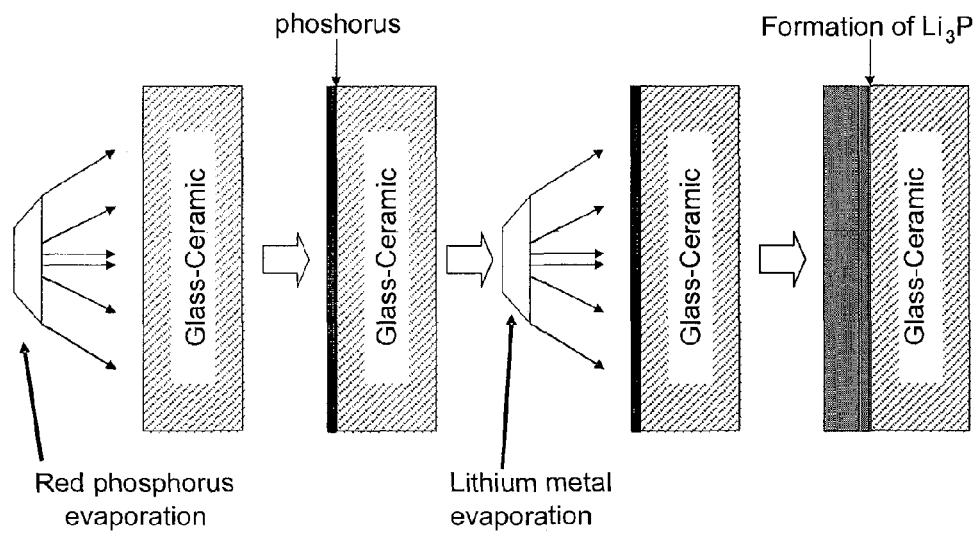

Alternatively, referring to FIG. 4B, a second method for forming a protective membrane composite in accordance with the present invention is shown. The ionically conductive chemically compatible first layer material is formed in situ following formation of a precursor layer on the second layer material. In the particular example illustrated in the figure, a surface of a glass-ceramic layer, for example one composed of the a glass-ceramic material described above, is coated with red phosphorus, a precursor for an active metal (in this case lithium) phosphide. Then a layer of lithium metal is deposited onto the phosphorus. The reaction of lithium and phosphorus forms $Li_3P$ according to the following reaction: $3Li+P=Li_3P$. $Li_3P$ is an ionically conductive material that is chemically compatible with both the lithium anode and the glass-ceramic material. In this way, the glass-ceramic (or other second layer material) is not in direct contact with the lithium electrode. Of course, other active metal, first layer precursor and second layer materials, as described herein, may be used as well. Alternative precursor examples include $Cu_3N$, which may be formed as a thin layer on a second layer material (e.g., glass-ceramic) and contacted with a Li anode in a similar manner according to the following reaction: $3Li+Cu_3N=Li_3N+3Cu$; or lead iodide which may be formed as a thin layer on a polymer electrolyte and contacted with a Li anode in a similar manner according to the following reaction: $2Li+PbI_2=2LiI+Pb$.

Figure 5:
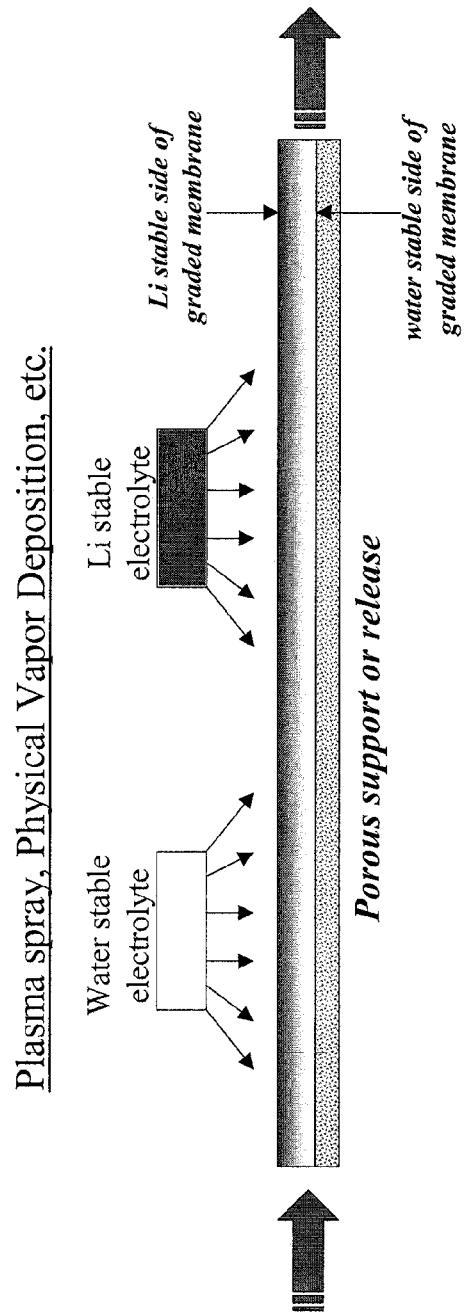

In another alternative, illustrated in FIG. 5, a protective membrane composite in accordance with the present invention may alternatively be compositionally and functionally graded so that there is a gradual transition of from one layer to the other. For example, a plasma spray operation with two spray heads, one for the deposition of a first component material, such as $Li_3N$, $Cu_3N$, $Li_3P$, LiPON, or other appropriate material, and the other for the deposition of a second component material, such as an glass-ceramic, for example as available for OHARA Corp., may be used. The first plasma spray process begins laying down a layer of pure glass-ceramic material, followed by a gradual decrease in flow as the second plasma spray torch is gradually turned on, such that there is a gradient from pure glass-ceramic to a continuous transition from glass-ceramic to pure LiPON or $Li_3N$, etc. In this way, one side of the membrane is stable to active metal (e.g., lithium, sodium, etc.) and the other side is substantially impervious and stable to the cathode, other battery cell components and preferably to ambient conditions. Electron beam deposition or thermal spray deposition may also be used. Given the parameters described herein, one or skill in the art will be able to use any of these techniques to form the graded composites of the invention.

To form a protected anode, lithium is then bonded to the graded membrane on the first layer material (stable to active metal) side of the graded protective composite, for example by evaporation of lithium onto the protective composite as described above. It may also be desirable to add a bonding layer on top of the lithium stable side of the graded composite protective layer, such as Sn, Ag, Al, etc., before applying lithium.

In any of the forgoing methods described with reference to FIGS. 4A-B and 5, rather than forming a lithium (or other active metal) layer on the first layer material or precursor, the first layer material or precursor of the protective composite may be contacted with the lithium by bonding metallic lithium to the protective interlayer material or precursor, for example by direct contact with extruded lithium metal foil.

In a further embodiment, a suitable substrate, e.g., having a wetting layer, such as a film of tin on copper, may be coated with a first layer material precursor, e.g., $Cu_3N$. This may then be coated with a second layer material, e.g., a (ionically) conductive glass. An active metal electrode may then be formed by plating the tin electrode with lithium (or other active metal), through the first and second layer materials. The $Cu_3N$ precursor is also converted to $Li_3N$ by this operation to complete the protective composite in accordance with the present invention on a lithium metal electrode. Details of an active metal plating process are described in commonly assigned U.S. Pat. No. 6,402,795, previously incorporated by reference.

With regard to the fabrication methods described above it is important to note that commercial lithium foils are typically extruded and have numerous surface defects due to this process, many of which have deep recesses that would be unreachable by line-of-sight deposition techniques such as RF sputter deposition, thermal and E-beam evaporation, etc. Another issue is that active metals such as lithium may be reactive to the thin-film deposition environment leading to further deterioration of the surface during the coating process. This typically leads to gaps and holes in a membrane deposited onto the surface of an active metal electrode. However, by inverting the process, this problem is avoided; lithium is deposited on the protective membrane rather than the protective membrane being deposited on lithium. Glass, and glass-ceramic membranes can be made quite smooth either by melt-casting techniques, cut and polish methods, or a variety of known methods leading to smooth surfaces (lithium is a soft metal that cannot be polished). Single or multiple smooth, gap-free membranes may then be deposited onto the smooth surface. After deposition is complete, active metal can be deposited onto the smooth surface by evaporation, resulting in an active metal/protective membrane interface that is smooth and gap-free. Alternatively, a transient bonding layer such as Ag can be deposited onto the protective membrane such that extruded lithium foil can be joined to the membrane by pressing the foil against the Ag layer.

Also as noted above, in an alternative embodiment of the invention the first layer may include additional components. For instance, a suitable first layer may include a polymer component to enhance its properties. For example, polymer-iodine complexes like poly(2-vinylpyridine)-iodine (P2VP-$I_2$), polyethylene-iodine, or tetraalkylammonium-iodine can react with Li to form an ionically conductive LiI-based film that is chemically compatible with both an active metal and a second layer material as described herein. Without intending to be bound by theory, it is expected that the use of polymer-iodine charge transfer complexes can lead to formation of composites containing LiI and polymer and having significantly higher ionic conductivity than that for pure LiI. Other halogens may also be used in this manner, for example in bromine complexes.

Figure 6A:
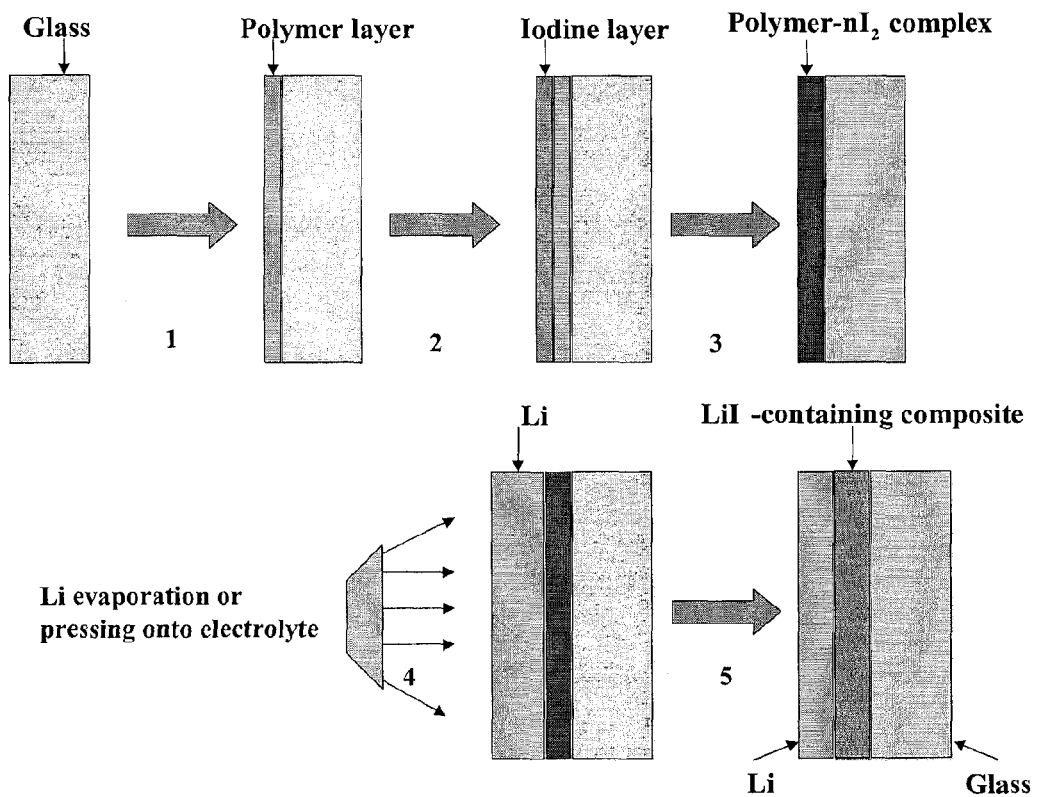

Referring to FIG. 6A, a first embodiment of this aspect of the present invention is shown. A polymer layer and a layer of iodine are coated on a second layer material surface and allowed to react forming polymer-iodine complex.

According to this method, a thin layer of polymer may be applied to the second material layer (e.g., conductive glass) using brushing, dipping, or spraying. For example, a conductive glass layer may be coated with a thin (e.g, 0.5 to 2.0 micron, preferably 0.1 to 0.5 micron) layer of P2VP in this way.

One technique for applying an iodine coating is sublimation of crystalline iodine that can be achieved at room temperature (e.g., about 20 to 25° C.) in a reactor placed in the dry box or in a dry room. A sublimed layer of iodine can be made very thin (e.g., 0.05 to 1.0 microns and the rate of sublimation can be adjusted by varying the temperature or distance between the substrate and source of iodine.

Alternatively, high concentrations (e.g., 50 to 100 g/liter of iodine can be dissolved in an organic solvent, such as acetonitrile and n-heptane. Dissolved iodine can be coated on the conductive glass surface by such methods as dip coating, spraying or brushing, among others. In this case, treatment conditions can be easily changed by varying the length of coating treatment and iodine concentrations. Examples of iodine sources for this technique include metal iodides are AgI and $PbI_2$, which are known to be used as the cathode materials in solid-state batteries with Li anode and LiI based solid electrolyte.

Then, lithium (or other active metal) is contacted with the polymer-iodine complex on the conductive glass (or other second layer material), for example by evaporation or pressing onto the glass coated with this complex. The result is a LiI-containing composite protective barrier layer on the Li anode.

Figure 6B:
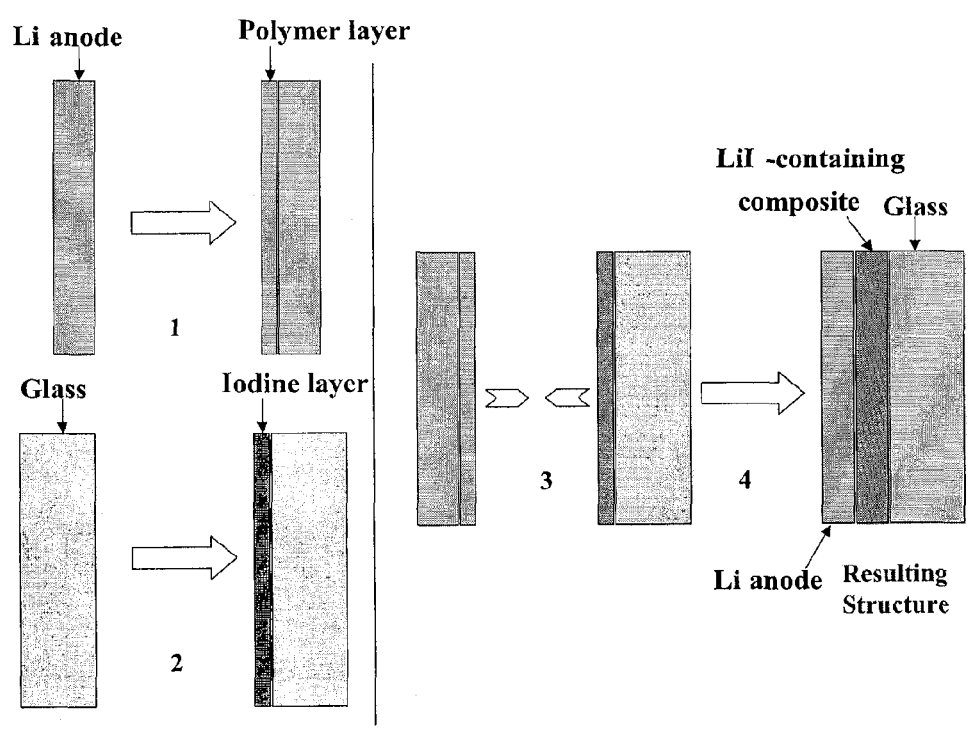

Referring to FIG. 6B, an alternative embodiment of this aspect of the present invention is shown. A conductive glass (or other second layer material) surface is coated with a thin layer of iodine, such as by a technique described above, that can react with Li forming LiI layer (A).

Active metal, for example lithium foil, can be coated with a thin layer of polymer (B), for example as described above, and then contacted with the iodine layer on the glass. After assembly, iodine reacts with the polymer layer and, as a result, LiI-containing composite protective barrier layer with reduced impedance is formed.

The protected anode structures with fully-formed protective layers and battery separators incorporating ambient stable precursors described above may be handled or stored in normal ambient atmospheric conditions without degradation prior to incorporation into a battery cell.

Active Metal/Aqueous Cells

The protected active metal anodes described herein enable the construction of active metal battery and other electrochemical cells having aqueous constituents in their cathodes, such as Li/water cells, Li/air cells and Li/metal hydride cells. Generally, such cells have a cathode structure comprising an electronically conductive component, an ionically conductive component, and an electrochemically active component, with at least one of these cathode structure components having an aqueous composition or constituent. These cells have greatly enhanced performance characteristics relative to conventional cells. As described further below, the cells have a broad array of potential implementations and applications. While these cell types operate according to different electrochemical reactions and have electrochemically active components in their cathodes drawn from different states (primarily liquid, gas and solid states, respectively), each of these cell types includes the common feature of an aqueous constituent for Li ion transport on the cathode side of the cell. The decoupling of the anode and cathode by the protective membrane allows for the fabrication of this powerful new type of battery or other electrochemical cell.

Active Metal/Water Cells

The present invention provides novel active metal/water battery and other electrochemical cells. These cells have an active metal, e.g., alkali metal, e.g., lithium (Li), anode with a protective membrane and a cathode structure with an aqueous electrochemically active component, for example water or aqueous peroxide solutions. The anode side of these cells is described above. In a cell, any part of the active metal electrode that is not covered by the protective membrane will generally be sealed off from the aqueous cathode environment, such as by a current collector material (e.g., copper), an o-ring seal, a crimp seal, polymer or epoxy sealant, or combination of these.

The cathode side of these cells includes a cathode structure with an electronically conductive component, an ionically conductive component, and at least an aqueous electrochemically active component. The aqueous electrochemically active component of these cells frequently has native ionic conductivity so that a single solution may act as both the electrochemically active component and the ionically conductive component. As described further with reference to specific embodiments below, the cells have an electronically conductive support structure electrically connected with the anode to allow electron transfer to reduce the cathode material (e.g., $H_2O$ in a Li/water cell). The electronically conductive support structure is generally porous to allow fluid flow and either catalytic (e.g., Ni, Pt) or treated with a catalyst to catalyze the reduction of the cathode material. An aqueous electrolyte with suitable ionic conductivity is generally in contact with the electronically conductive support structure to allow ion transport through the electronically conductive support structure to complete the redox reaction.

The electronically conductive support structure may also be treated with an ionomer, such as per-fluoro-sulfonic acid polymer film (e.g., du Pont NAFION) to expand the range of acceptable aqueous electrochemically active components to those having little or no native ionic conductivity. An additional advantage of ionomers like NAFION is that the salt is chemically bonded to the polymer backbone, and therefore cannot be flushed out in flow-through or open cell implementations, described below.

The battery cells may be primary or secondary cells. For primary cells, the cathode side of the cells may be open to the environment and the oxidized lithium on the cathode side of the cell may simply disperse into the environment. Such a cell may be referred to as an "open" cell. Cells for marine applications which use sea water as an electrochemically active and ionically conductive material are an example. For secondary cells, the oxidized lithium is retained in a reservoir on the cathode side of the cell to be available to recharge the anode by moving the Li ions back across the protective membrane when the appropriate potential is applied to the cell. Such a cell may be referred to as a "closed" cell. Such closed cells require venting for the hydrogen produced at the cathode. Appropriate battery cell vents are known in the art.

An example of an active metal/water battery cell in accordance with the present invention is a lithium/water battery cell, as conceptually illustrated above in FIG. 1. FIG. 7 illustrates a specific implementation of such a lithium/water battery cell in accordance with the present invention. The battery cell 700 includes a lithium negative electrode (anode) 702. Alternatively, another active metal, particularly an alkali metal, may be used. The lithium metal electrode can be bonded to a lithium ion conductive protective membrane 704 according to any of the techniques described herein and in the patent applications incorporated by reference, as described above, with or without the use of a bond coat such as a thin layer of Ag or other suitable alloying metal, depending upon the technique used. The cell also includes a cathode structure composed of a porous catalytic electronically conductive support structure 706, a electrochemically active material (e.g., water) and an aqueous electrolyte 708 (e.g., salt water, or aqueous solutions of LiCl, LiBr, LiI, $NH_4Cl$, $NH_4Br$, etc. may act as both the electrochemically active component and the ionically conductive component; or, as noted below, in the case where ionomers are used, little or no salt may be needed). In some implementations, an optional separator (not shown) may be provided between the protective membrane 704 and the porous catalytic electronically conductive support structure 706. This separator may be useful to protect the protective membrane from the possibility of being damaged by any roughness on the porous catalytic electronically conductive support structure 706 and may provide a fluid reservoir for the aqueous cathode active material/electrolyte. It may be composed of a polyolefin such as polyethylene or polypropylene, for example a CELGARD separator. It should be understood that in this cell the electrochemically active component (water) and the ionically conductive component (aqueous electrolyte) will be intermixed in a single solution and are thus shown as the single element 708.

As noted above, on the cathode side of the protective membrane, the cell includes a cathode structure with an electronically conductive component, an aqueous and/or ionomeric ionically conductive component, and at least an aqueous electrochemically active component. In one embodiment these components are represented by an aqueous electrolyte 708 and a porous catalytic electronically conductive support structure 706. The electrochemically active material in a Li/water battery is water. While not so limited, the electrochemical reaction between the Li ions from the anode and the water is believed to be described by the following reaction scheme:

$$Li+H_2O=LiOH+\tfrac{1}{2}H_2.$$

Thus, for every mol of Li and water reacted, a mol of LiOH and one half mol of hydrogen gas is produced.

The cell's aqueous electrolyte provides ion carriers for transport (conductivity) of Li ions and anions that combine with Li. As noted above, the electrochemically active component (water) and the ionically conductive component (aqueous electrolyte) will be intermixed as a single solution, although they are conceptually separate elements of the battery cell. Suitable electrolytes for the Li/water battery cell of the invention include any aqueous electrolyte with suitable ionic conductivity. Suitable electrolytes may be acidic, for example, strong acids like HCl, $H_2SO_4$, $H_3PO_4$ or weak acids like acetic acid/Li acetate; basic, for example, LiOH; neutral, for example, sea water, LiCl, LiBr, LiI; or amphoteric, for example, $NH_4Cl$, $NH_4Br$, etc The suitability of sea water as an electrolyte enables a battery cell for marine applications with very high energy density. Prior to use, the cell structure is composed of the protected anode and the porous electronically conductive support structure (electronically conductive component). When needed, the cell is completed by immersing it in sea water which provides the electrochemically active and ionically conductive components. Since the latter components are provided by the sea water in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

Secondary Li/water cells are also possible in accordance with the invention. As noted above, such cells are referred to as "closed" cells since the reaction products on the cathode side are contained on the cathode side of the cell to be available to recharge the anode by moving the Li ions back across the protective membrane when the appropriate recharging potential is applied to the cell.

As noted above and described further below, in another embodiment of the invention, ionomers coated on the porous catalytic electronically conductive support reduce or eliminate the need for ionic conductivity in the electrochemically active material.

The electrochemical reaction that occurs in a Li/water cell is a redox reaction in which the electrochemically active cathode material gets reduced. In a Li/water cell, the catalytic electronically conductive support facilitates the redox reaction. As noted above, while not so limited, in a Li/water cell, the cell reaction is believed to be:

$$Li+H_2O=LiOH+\tfrac{1}{2}H_2.$$

The half-cell reactions at the anode and cathode are believed to be:

Anode: $Li=Li^++e^-$

Cathode: $e^-+H_2O=OH^-+\tfrac{1}{2}H_2$

Accordingly, the catalyst for the Li/water cathode promotes electron transfer to water, generating hydrogen and hydroxide ion. A common, inexpensive catalyst for this reaction is nickel metal; precious metals like Pt, Pd, Ru, Au, etc. will also work but are more expensive.

Also considered to be within the scope of Li (or other active metal)/water batteries of this invention are batteries with a protected Li anode and an aqueous electrolyte composed of gaseous and/or solid oxidants soluble in water that can be used as active cathode materials (electrochemically active component). Use of water soluble compounds, which are stronger oxidizers than water, can significantly increase battery energy in some applications compared to the lithium/water battery, where during the cell discharge reaction, electrochemical hydrogen evolution takes place at the cathode surface. Examples of such gaseous oxidants are $O_2$, $SO_2$ and $NO_2$. Also, metal nitrites, in particular $NaNO_2$ and $KNO_2$ and metal sulfites such as $Na_2SO_3$ and $K_2SO_3$ are stronger oxidants than water and can be easily dissolved in large concentrations. Another class of inorganic oxidants soluble in water are peroxides of lithium, sodium and potassium, as well as hydrogen peroxide $H_2O_2$.

The use of hydrogen peroxide as an oxidant can be especially beneficial. There are at least two ways of utilizing hydrogen peroxide in a battery cell in accordance with the present invention. First of all, chemical decomposition of hydrogen peroxide on the cathode surface leads to production of oxygen gas, which can be used as active cathode material. The second, perhaps more effective way, is based on the direct electroreduction of hydrogen peroxide on the cathode surface. In principal, hydrogen peroxide can be reduced from either basic or acidic solutions. The highest energy density can be achieved for a battery utilizing hydrogen peroxide reduction from acidic solutions. In this case a cell with Li anode yields $E^0$=4.82 V (for standard conditions) compared to $E^0$=3.05 V for Li/Water couple. However, because of very high reactivity of both acids and hydrogen peroxide to unprotected Li, such cell can be practically realized only for protected Li anode in accordance with the present invention.

In order to increase efficiency of hydrogen peroxide reduction on the cathode surface, especially at high discharge rates, electrolyte flow can be used in lithium/water cells with dissolved hydrogen peroxide. In this case hydrogen peroxide plays a role of a fuel continuously supplied to the cathode surface. High energy density cells for marine applications having a protected Li anode in accordance with the present invention can utilize hydrogen peroxide dissolved in sea water and continuously flowing through the cell.

Active Metal/Air Battery Cells

Active metal/air battery cells are another class of active metal/aqueous cells in accordance with the present invention. These cells have an active metal, e.g., alkali metal, e.g., lithium (Li), anode with a protective membrane and a cathode structure with air as the electrochemically active component. While not so limited, the electrochemical reaction between the Li ions from the anode and the air is believed to be described by one or more of the following reaction schemes:

$$Li+\tfrac{1}{2}H_2O+\tfrac{1}{4}O_2=LiOH$$

$$Li+\tfrac{1}{4}O_2=\tfrac{1}{2}Li_2O$$

$$Li\tfrac{1}{2}O=\tfrac{1}{2}Li_2O_2$$

Thus both moisture ($H_2O$) and oxygen in the air are participants in the electrochemical reaction.

The anode side of these cells is the same as for any of the active metal/aqueous cells provided herein, and is described above. In a cell, any part of the active metal electrode that is not covered by the protective membrane will generally be sealed off from the air cathode environment, such as by a current collector material (e.g., copper), an o-ring seal, a crimp seal, polymer or epoxy sealant, or combination of these.

The cathode side of these cells includes a cathode structure with an electronically conductive component, an ionically conductive component, and air as an electrochemically active component. The air electrochemically active component of these cells includes moisture to provide water for the electrochemical reaction. As described further with reference to specific embodiments below, the cells have an electronically conductive support structure electrically connected with the anode to allow electron transfer to reduce the air cathode active material. The electronically conductive support structure is generally porous to allow fluid (air) flow and either catalytic or treated with a catalyst to catalyze the reduction of the cathode active material. An aqueous electrolyte with suitable ionic conductivity or ionomer is also in contact with the electronically conductive support structure to allow ion transport within the electronically conductive support structure to complete the redox reaction.

Figure 8:
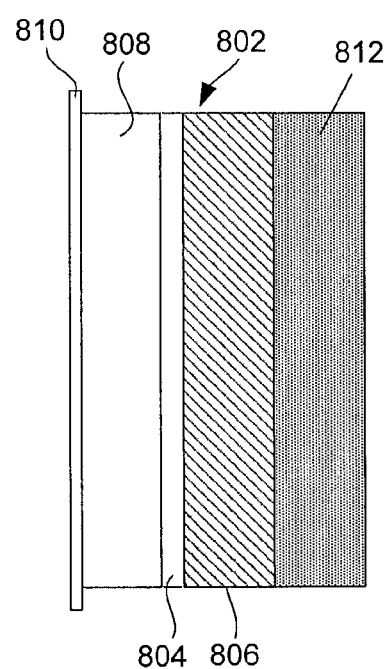
FIG. 8 illustrates a lithium/air battery cell in accordance with the present invention.

One example of a Li/air battery cell in accordance with the present invention is illustrated in FIG. 8. In the embodiment, the cell 800 includes an active metal negative electrode (anode) 808, e.g., lithium, bonded with a current collector 810, e.g., copper, and a laminate protective membrane composite 802. As described above, a protective membrane composite laminate 802 is composed of a first layer 804 of a material that is both ionically conductive and chemically compatible with an active metal electrode material, and a second layer 806 composed of a material substantially impervious, ionically conductive and chemically compatible with the first material and an aqueous environment. The cell also includes a cathode structure (sometimes referred to as an "air electrode") 812 with an electronically conductive component, an aqueous and/or ionomeric ionically conductive component, and air as the electrochemically active component. As with the Li/water cells, in some implementations, an optional separator (not shown) may be provided between the protective membrane 802 and the cathode structure. This separator may be useful to protect the protective membrane from the possibility of being damaged by any roughness on the cathode structure 812, which may be a porous catalytic electronically conductive support structure, as described further below. In the case of Li/air batteries with acidic electrolyte, the separator can improve cell capacity delivered before the electrolyte converts into a basic solution due to the cell discharge reaction and, accordingly, becomes reactive to atmospheric $CO_2$ (carbonation reaction). It may be composed of a polyolefin such as polyethylene or polypropylene, for example a CELGARD separator.

The cathode structure 812 includes an electronically conductive component (for example, a porous electronic conductor, an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, NY, Third Edition) and are usually composed of several layers including an air diffusion membrane, a hydrophobic Teflon layer, a catalyst layer, and a metal electronically conductive component/current collector, such as a Ni screen. The catalyst layer also includes an ionically conductive component/electrolyte that may be aqueous and/or ionomeric. A typical aqueous electrolyte is composed of KOH dissolved in water. An typical ionomeric electrolyte is composed of a hydrated (water) Li ion conductive polymer such as a per-fluoro-sulfonic acid polymer film (e.g., du Pont NAFION). The air diffusion membrane adjusts the air (oxygen) flow. The hydrophobic layer prevents penetration of the cell's electrolyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal electrode, the chemical composition of the air electrode is not constrained by potential reactivity with the anode active material. This can allow for the design of higher performance air electrodes using materials that would normally attack unprotected metal electrodes.

Since metal/air batteries obtain the cathode active reactant from the ambient environment, the volumetric and gravimetric energy densities are very high. The high energy density of metal/air batteries makes them attractive for a wide variety of applications where weight and size are a premium. Unfortunately, conventional metal/air batteries suffer from parasitic reactions in which the metal electrode corrodes to generate hydrogen. The anode corrosion reaction can be minimized by incorporating KOH in the electrolyte. However, this introduces another problem as $CO_2$ from the air is converted to $K_2CO_3$ in the air electrode, thereby forming precipitates that cause premature failure of the cell. Such problems are eliminated by the subject invention in that the active metal electrode is isolated from the aqueous electrolyte, preventing corrosion of the anode. Since the anode does not corrode in the electrolyte solution, and is in fact de-coupled from it, the air electrode can be formulated with neutral (LiCl), basic (KOH), or acidic ($NH_4Cl$, HCl, etc.) electrolyte. While not so limited, for the case of acidic electrolyte, shown below, the cell reaction is believed to proceed by forming lithium chloride. In such a cell, the air electrode does not scavenge $CO_2$ from the air, and there is no $K_2CO_3$ formation.

The subject invention allows the use of neutral or acidic electrolytes in active metal/air batteries due to the fact that the aqueous electrolyte is not in contact with the metal anode, and thereby cannot corrode the metal anode.

The Li/air cells of the present invention may be either primary or secondary cells.

Active Metal/Metal Hydride Battery Cell

Figure 9:
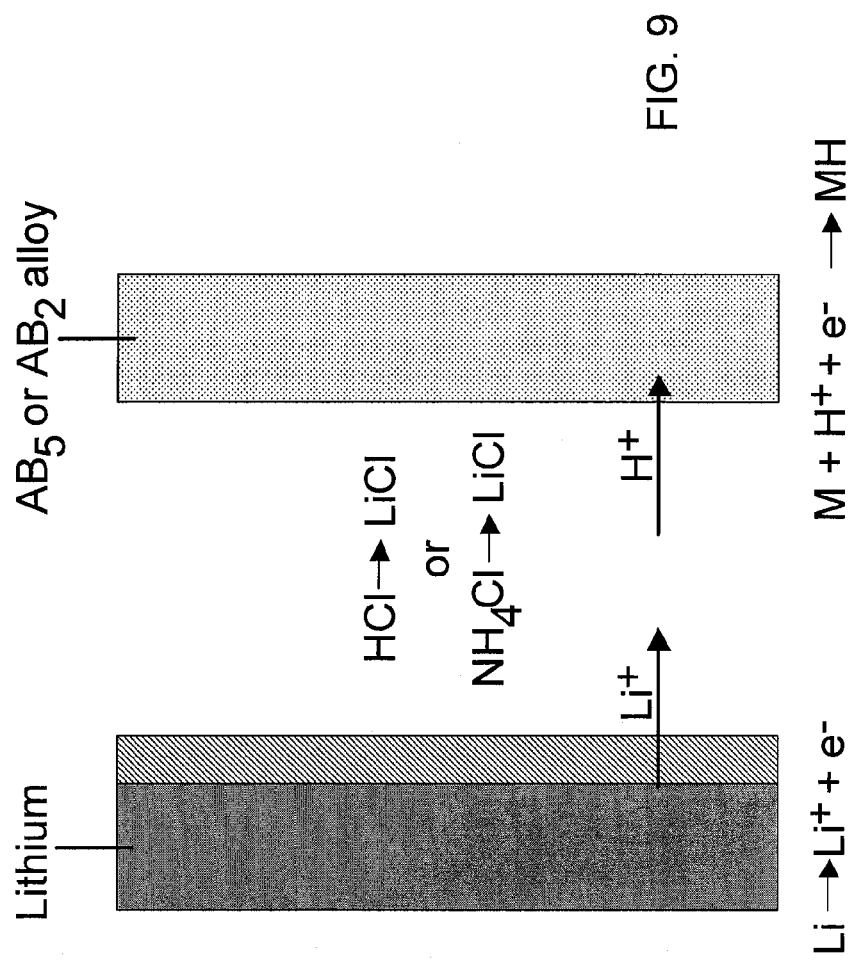
FIG. 9 illustrates a lithium/metal hydride battery cell in accordance with one embodiment of the present invention.

Another type of active metal/aqueous battery cell incorporating a protected anode and a cathode structure with an aqueous component in accordance with the present invention is a lithium (or other active metal)/metal hydride battery, as illustrated in FIG. 9. For example, protected lithium anodes as described herein can be discharged and charged in aqueous solutions suitable as electrolytes in a lithium/metal hydride battery. Suitable electrolytes provide a source or protons. Examples include aqueous solutions of halide acids or acidic salts, including chloride or bromide acids or salts, for example HCl, HBr, $NH_4Cl$ or $NH_4Br$.

During discharge, lithium ions from the anode pass through the ionically conductive protective membrane into the aqueous electrolyte, and protons are reduced to hydride ions that are incorporated into the metal alloy positive electrode (cathode). Thus, the cathode side of the cell has a cathode structure an electronically conductive component (metal alloy), an ionically conductive component (aqueous electrolyte), and an electrochemically active component (protons/metal alloy). This is analogous to known metal hydride chemistry used in nickel/metal hydride (Ni/MH) batteries.

However, in this case the acid in the electrolyte is consumed and converted to lithium salt. The cells may be primary, but are generally secondary (rechargeable) due to materials costs. On recharge of secondary cells, lithium ions are transported through the protective membrane to the lithium electrode and reduced to Li metal, while the metal hydride is oxidized to release protons and regenerate the acid electrolyte. Such a cell exhibits excellent cycle life due to the highly reversible nature of the positive and negative electrodes.

While not so limited, the half and full cell reactions for a lithium/metal hydride cell in accordance with the present invention are believed to be as follows:

Anode: $Li = Li^+ + e^-$

Cathode: $HCl + M + e^- = MH + Cl^-$

Cell Reaction: $Li + HCl + M = LiCl + MH$

Metal hydride alloys are well known to those skilled in the art, and are generally chosen from rare earth based alloys (Misch metal) designated as $AB_5$ ($LaNi_5$ and $LaCo_5$ with partial substitutions to improve performance) and $AB_2$ alloys consisting of titanium and zirconium (such as $ZrNi_2$). The metal hydride electrode is typically engineered as a highly porous structure having a perforated nickel foil or grid onto which a polymer-bonded active hydrogen storage alloy is coated. The metal hydride electrode is used commercially in the nickel/metal hydride (Ni/MH) battery. In this chemistry, an alkaline electrolyte is used, and the hydride alloys are modified to perform well in alkaline conditions. For the case of a Li/MH battery, the electrolyte will be acidic, and so the composition of the $AB_5$ or $AB_2$ alloy may be modified to cycle well in acidic electrolytes.

Li/Water Battery and Hydrogen Generator for Fuel Cell

The use of protective layers on active metal electrodes in accordance with the present invention allows the construction of active metal/water batteries that have negligible corrosion currents, described above. The Li/water battery has a very high theoretical energy density of 8450 Wh/kg. The cell reaction is $Li + H_2O = LiOH + \frac{1}{2}H_2$. Although the hydrogen produced by the cell reaction is typically lost, in this embodiment of the present invention it is used to provide fuel for an ambient temperature fuel cell. The hydrogen produced can be either fed directly into the fuel cell or it can be used to recharge a metal hydride alloy for later use in a fuel cell. At least one company, Millenium Cell, makes use of the reaction of sodium borohydride with water to produce hydrogen. However, this reaction requires the use of a catalyst, and the energy produced from the chemical reaction of $NaBH_4$ and water is lost as heat.

$$NaBH_4 + 2H_2O \rightarrow 4H_2 + NaBO_2$$

When combined with the fuel cell reaction, $H_2 + O_2 = H_2O$, the full cell reaction is believed to be:

$$NaBH_4 + 2O_2 \rightarrow 2H_2O + NaBO_2$$

The energy density for this system can be calculated from the equivalent weight of the $NaBH_4$ reactant (38/4=9.5 grams/equiv.). The gravimetric capacity of $NaBH_4$ is 2820 mAh/g; since the voltage of the cell is about 1, the specific energy of this system is 2820 Wh/kg. If one calculates the energy density based on the end product $NaBO_2$, the energy density is lower, about 1620 Wh/kg.

In the case of the Li/water cell, the hydrogen generation proceeds by an electrochemical reaction believed described by:

$$Li + H_2O = LiOH + \frac{1}{2}H_2$$

Figure 10:
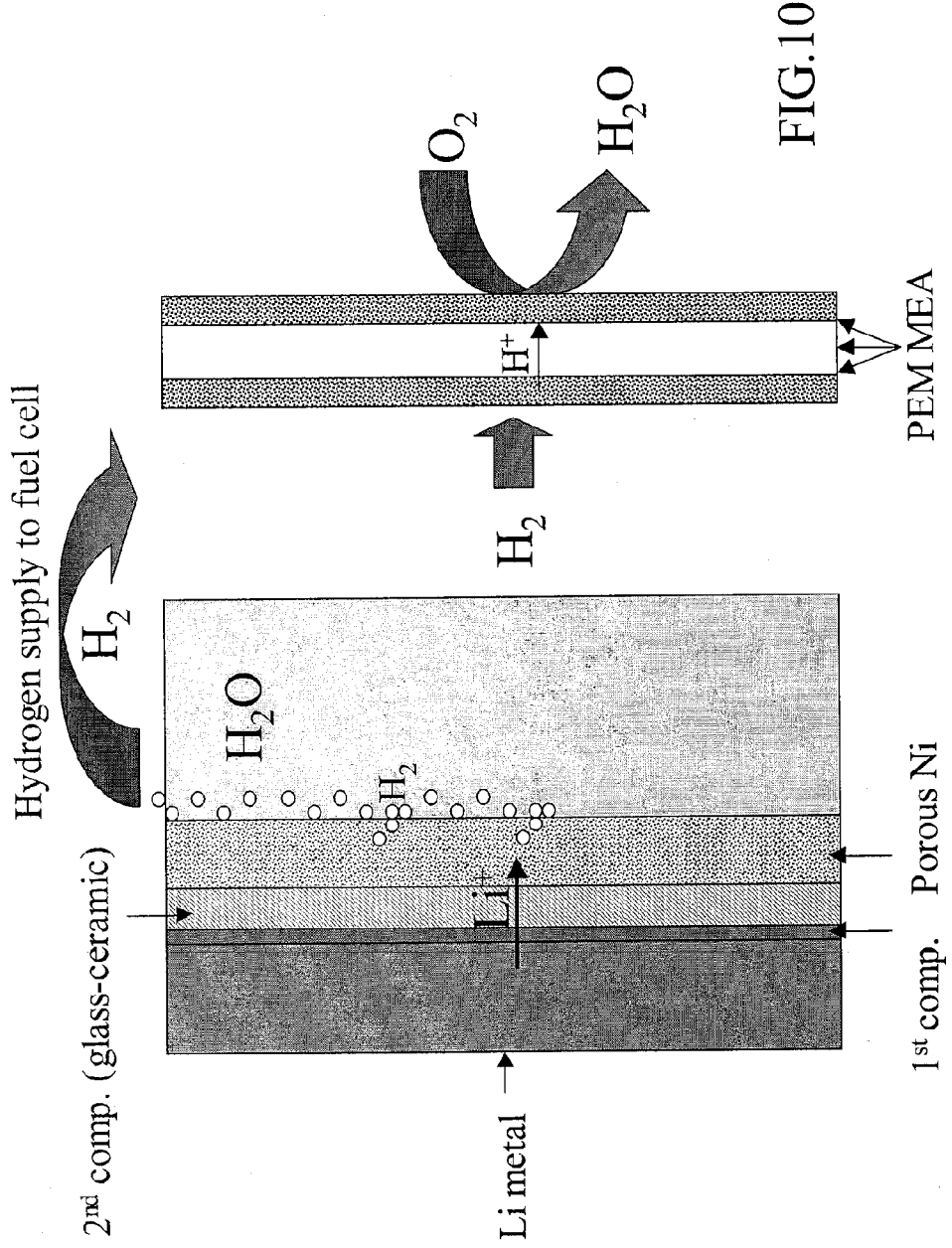
FIG. 10 illustrates a Li/water battery and hydrogen generator for a fuel cell in accordance with one embodiment of the present invention.

In this case, the energy of the chemical reaction is converted to electrical energy in a 3 volt cell, followed by conversion of the hydrogen to water in a fuel cell, giving an overall cell reaction believed described by:

$$Li + \frac{1}{2}H_2O + \frac{1}{4}O_2 = LiOH$$

where all the chemical energy is theoretically converted to electrical energy. The energy density based on the lithium anode is 3830 mAh/g at a cell potential of about 3 volts which is 11,500 Wh/kg (4 times higher than $NaBH_4$). If one includes the weight of water needed for the reaction, the energy density is then 5030 Wh/kg. If the energy density is based on the weight of the discharge product, LiOH, it is then 3500 Wh/kg, or twice the energy density of the $NaBO_2$ system. This can be compared to previous concepts where the reaction of lithium metal with water to produce hydrogen has also been considered. In that scenario the energy density is lowered by a factor of three, since the majority of the energy in the $Li/H_2O$ reaction is wasted as heat, and the energy density is based on a cell potential for the $H_2/O_2$ couple (as opposed to 3 for $Li/H_2O$) which in practice is less than one. In this embodiment of the present invention, illustrated in FIG. 10, the production of hydrogen can also be carefully controlled by load across the Li/water battery, the Li/water battery has a long shelf life due to the protective membrane, and the hydrogen leaving the cell is already humidified for use in the $H_2$/air fuel cell.

Catalytic Electronically Conductive Support Structures for Li/water and Li/air Cells Any suitable catalytic electronically conductive support structure sufficiently porous so that surface area is maximized without limiting mass transfer of the electrochemically active material may be used in the Li/water and Li/air cells of the present invention. Suitable porous support materials include those that are inherently electronically conductive and those that are treated (e.g., coated) to become electronically conductive. Supports composed of a porous material that is not electronically conductive (but possibly ionically conductive) include alumina, silica glass, ceramics, glass-ceramics and water-stable polymers. The insulating support is metallized in order to carry current. Insulating supports can be metallized by a process known as electroless deposition in which a catalyst and reducing agent are adsorbed onto the surface of the insulator before exposing it to a solution of metal ions in solution which are reduced to metal on the surface according to techniques known in the art. Typical metal coatings are copper and nickel. Nickel is particularly preferred for its catalytic properties (particularly in Li/water cells).

Suitable glass, ceramic, and glass-ceramic supports can be an inert material, or made from an ionically conductive material such as are suitable for the protective membrane described herein. The porous support may be made through tape-casting or extrusion of a glass or ceramic or glass-ceramic powder/polymer binder/solvent mixture. Onto the porous support a second layer of finer glass or ceramic or glass-ceramic powder could be laid down by tape-casting or extrusion such that when the two-layer article is fired, the coarse support layer retains porosity while the thin-film densifies completely to become the a component of the protective membrane. Alternatively, the support layer could be pre-fired, and then a thin-film laid down by tape-casting or extrusion, and fired to full density.

A glass, ceramic or glass-ceramic component of the protective membrane can also be applied by melt-spray techniques, such as plasma-spray and vacuum plasma-spray, or other thermal spray techniques; such films may also need heat treatment as described as described in the publication Jie Fu, J. Amer. Ceram. Soc., 80 [7] p. 1901-1903 (1997) and the patents of OHARA Corp., previously cited and incorporated by reference herein, to improve the ionic conductivity of the solid In such processes, the membrane material may be supplied to a plasma torch nozzle as a powder, and sprayed out of the nozzle as fine molten droplets. The molten droplets hit the substrate and solidify. In this manner, a glass, ceramic or glass-ceramic film can be directly deposited onto dense or porous substrates to produce either a porous or dense film, depending on operating parameters.

Suitable polymeric supports include polyethylene, polypropylene, Kevlar, Nylon, etc. As an example, a thin glass-ceramic layer may be tape-cast and fired to full density. Then the polymeric support would be deposited onto the glass-ceramic film by tape-casting of a polymer/binder/solvent film, and allowed to dry.

Suitable inherently electronically conductive supports included co-fired and pre-fired metals. A porous stainless steel support may be fabricated through tape-casting or extrusion. Onto the porous support, a thin glass or glass-ceramic layer could be deposited by tape-casting. The 2-layer structure could then be fired at low temperature (e.g., <900° C.) in air, or at higher temperatures under reducing conditions (e.g., $H_2$ furnace) to minimize oxidation of the stainless steel support during sintering. A porous nickel support could be fabricated as described above, but would have to be fired under reducing conditions to prevent oxidation of Ni to NiO. Alternatively, the porous support is pre-fired to the desired porosity. A second layer of glass-ceramic could be applied to the porous support by tape-casting, aerosol-spray coating, electrophoretic deposition, etc. Since the substrate will not sinter during firing (since it is pre-sintered), the film will undergo constrained sintering (constrained by a non-sintering substrate). Since the film is a glass and can flow during firing, this is not a problem.

Non-catalytic porous supports are impregnated with a catalyst to facilitate the reduction of water for reaction with the Li ions from the anode that pass through the protective layer.

In the case of the nickel support, the nickel surface is catalytic for the reduction of water, and so, catalyst impregnation is probably unnecessary for that application.

Sample Cell Fabrication, Components and Configurations

Deposition Technique for Cell Fabrication

Figure 11:
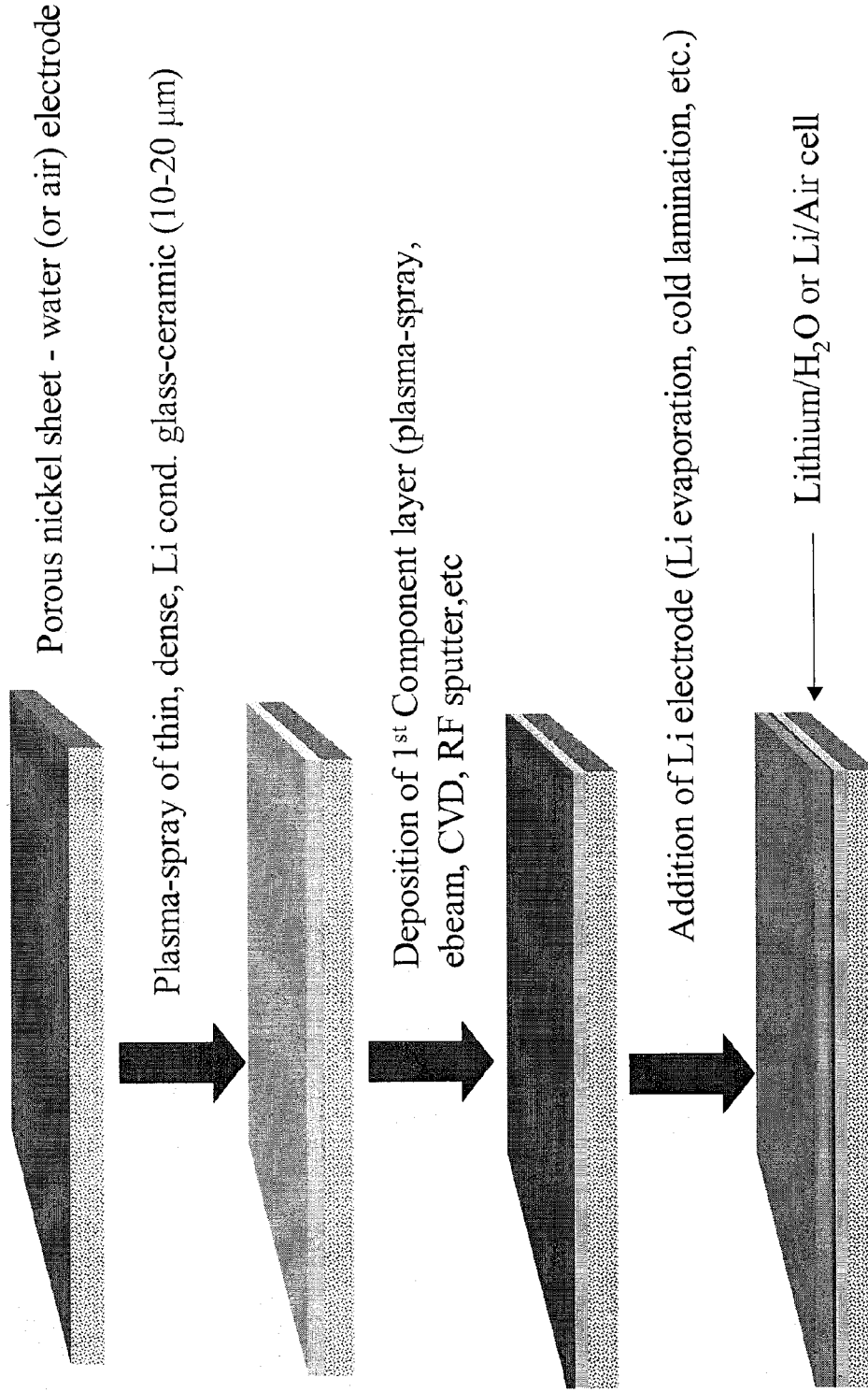
FIG. 11 depicts the fabrication of a thin-film Li/water or Li/air battery using plasma-spray and other deposition techniques in accordance with one embodiment of the present invention.

FIG. 11 depicts the fabrication of a thin-film Li/water or Li/air battery using plasma-spray and other deposition techniques in accordance with one embodiment of the present invention. A laminate protective composite membrane is formed on a porous nickel catalytic electronically conductive support. Then lithium metal is deposited on the protective membrane. An advantage of using plasma-spray is that the substrate can be maintained at a relatively low temperature; so, for example the porous nickel support will at a sufficiently low temperature (below about 500° C.) that the conversion of Ni to NiO is prevented. The porous Ni support is then covered with a thin glass or glass-ceramic membrane by plasma-spray. A subsequent lithium compatible layer of LiPON or other suitable materials such as $Cu_3N$ is deposited onto the glass membrane by suitable technique, such as ebeam evaporation, RF sputtering, CVD, or plasma-spray. Onto the lithium compatible layer, it may be desirable to deposit a thin Ag transient coating by vacuum evaporation, as described above. Finally, a lithium electrode is either evaporated onto the assembly (i.e. Li/Ag/LiPON/Ni), or mechanically bonded to the assembly by pressing.

The cell will be completed when needed by the subsequent addition of water and electrolyte to the porous electronically conductive support, for example by immersing it in seawater or other aqueous electrolytic solution. In the actual battery cell, the lithium metal electrode will be isolated from the seawater environment by means of a hermetic seal that may be composed of elastomeric or epoxy resins.

The catalytic electronically conductive support may also be treated with an ionomer, such as per-fluoro-sulfonic acid polymer film (e.g., du Pont NAFION) to expand the range of acceptable electrolytes to those having little or no native ionic conductivity.

The porous catalytic electronically conductive support may also be structurally reinforced with a metal frame to enhance its rigidity and strength. The frame may be composed of any suitable metal, such as stainless steel or aluminum. In a particular embodiment, the frame may be arranged in a grid pattern, such as that illustrated below in FIGS. 12. B and D.

Supported Protective Membrane Structure and Fabrication

The use of thin protective membranes is desirable for several reasons including reducing materials costs, reducing weight and therefore increasing energy density and facilitating ion transport through the membrane. In order to use the thinnest possible protective membrane layer for a Li/aqueous cell, a thin ionically conductive glass-ceramic (for example) film is produced by an appropriate technique, such as tape-casting. Film thicknesses of a few microns to many microns are well known to those skilled in the art of tape-casting, and such films are routinely used in multi-layer ceramic capacitors. The ionically conducting glass-ceramic is tape-cast and then fired to full density. The 10 to 50 micron film is still fragile at this point.

In another embodiment, the thin glass or glass-ceramic membrane could be made by "draw-down" techniques as described by Sony Corporation and Shott Glass (T. Kessler, H. Wegener, T. Togawa, M. Hayashi, and T. Kakizaki, "Large Microsheet Glass for 40-in. Class PALC Displays," 1997, FMC2-3, downloaded from Shott Glass website, incorporated herein by reference. In essence, the glass is handled in the molten state which allows the drawing of thin ribbons of glass. If the cooling rate of the glass sheet exceeds the crystallization rate, then the glass will be essentially amorphous. Since many of Nasicon-type glasses require the presence of a crystalline phase for high conductivity, it may be necessary to heat treat the thin glass sheets to allow crystallization of the conductive phase and formation of a "glass-ceramic" as described in the publication Jie Fu, J. Amer. Ceram. Soc., 80 [7] p. 1901-1903 (1997) and the patents of OHARA Corp., previously cited and incorporated by reference herein, to improve the ionic conductivity of the solid. The process of crystallization (devitrification of the amorphous state) may also lead to surface roughness. Accordingly, the heat treatment may have to be optimized to promote small grained morphology, or a further chemical or mechanical polishing of the surface may be needed.

The thin glass-ceramic membrane produced by either technique can then be attached to an electronically conductive porous support (e.g. metal or metallized as described above) by adhesive bonding (e.g., with epoxy, elastomeric, and/or ceramic adhesives) or firing in an oven for example. One example of this approach is illustrated in FIGS. 12A-E. A metal frame has open areas filled with porous catalytic electronically conductive support material for the Li/water redox reaction. In this way, the thin glass-ceramic film is supported by the metal frame that is a porous, catalytic for water reduction, and electronically conductive support structure.

Figure 12E:
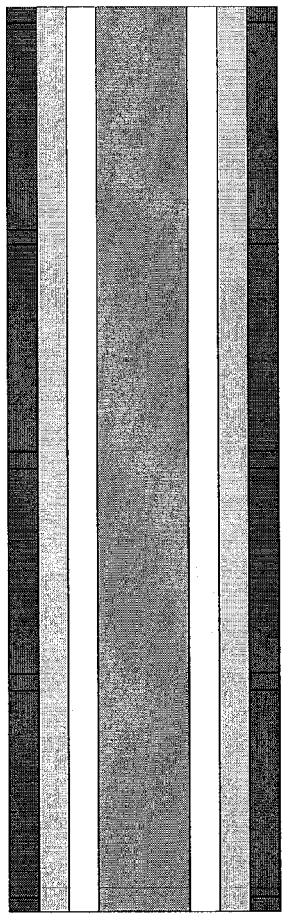

In a second embodiment, porous catalytic electronically conductive support such as nickel foam is bonded directly onto the thin glass-ceramic protective membrane component, and the glass-ceramic/porous catalytic electronically conductive support element is then either bonded or placed on the metal frame support. Such structures can also be made in a symmetric arrangement, as shown in FIG. 12E, to improve the strength of the structure and maximize the air electrode area.

In yet another embodiment, the glass membrane itself is strengthened through use of a grid pattern imposed on the glass by a "waffle"-type mold. To do this, the molten glass can be injected or pressed into an appropriate mold to impose reinforcing ridges into the glass, while maintaining a thin membrane between the ridges. If necessary the "waffle" can then be heat-treated, as described above, to improve the ionic conductivity of the solid. The "waffle" type solid electrolyte can then be bonded to the porous nickel electrode.

Elastomeric Seals

Figure 13:
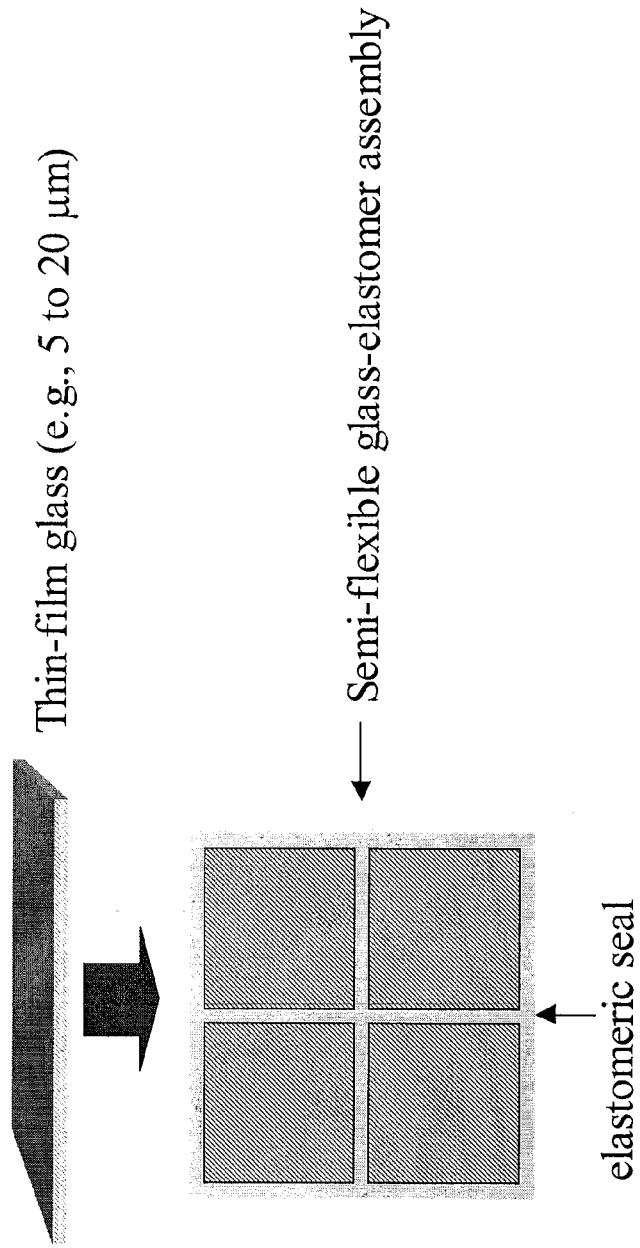
FIG. 13 shows an embodiment in accordance with the present invention in which a plurality of glass, ceramic or glass-ceramic ionically conductive protective membrane plates are bonded into an array by elastomeric seals.

FIG. 13 shows an embodiment in accordance with the present invention in which a plurality of glass, ceramic or glass-ceramic ionically conductive protective plates are bonded into an array by elastomeric seals. In this manner the array has some conformability due to the elastomeric nature of the plate-to-plate seals. The plates may already be bonded to a porous catalytic electronically conductive substrate, and then lithium (or other active metal) could be deposited on the other side of the plates to form an anode and complete the solid state portion of the cell (the cathode/electrolyte being in the liquid state). Alternatively, complete solid state portions of cells could also be bonded together as shown in FIG. 13.

Tubular Construction

Figure 14:
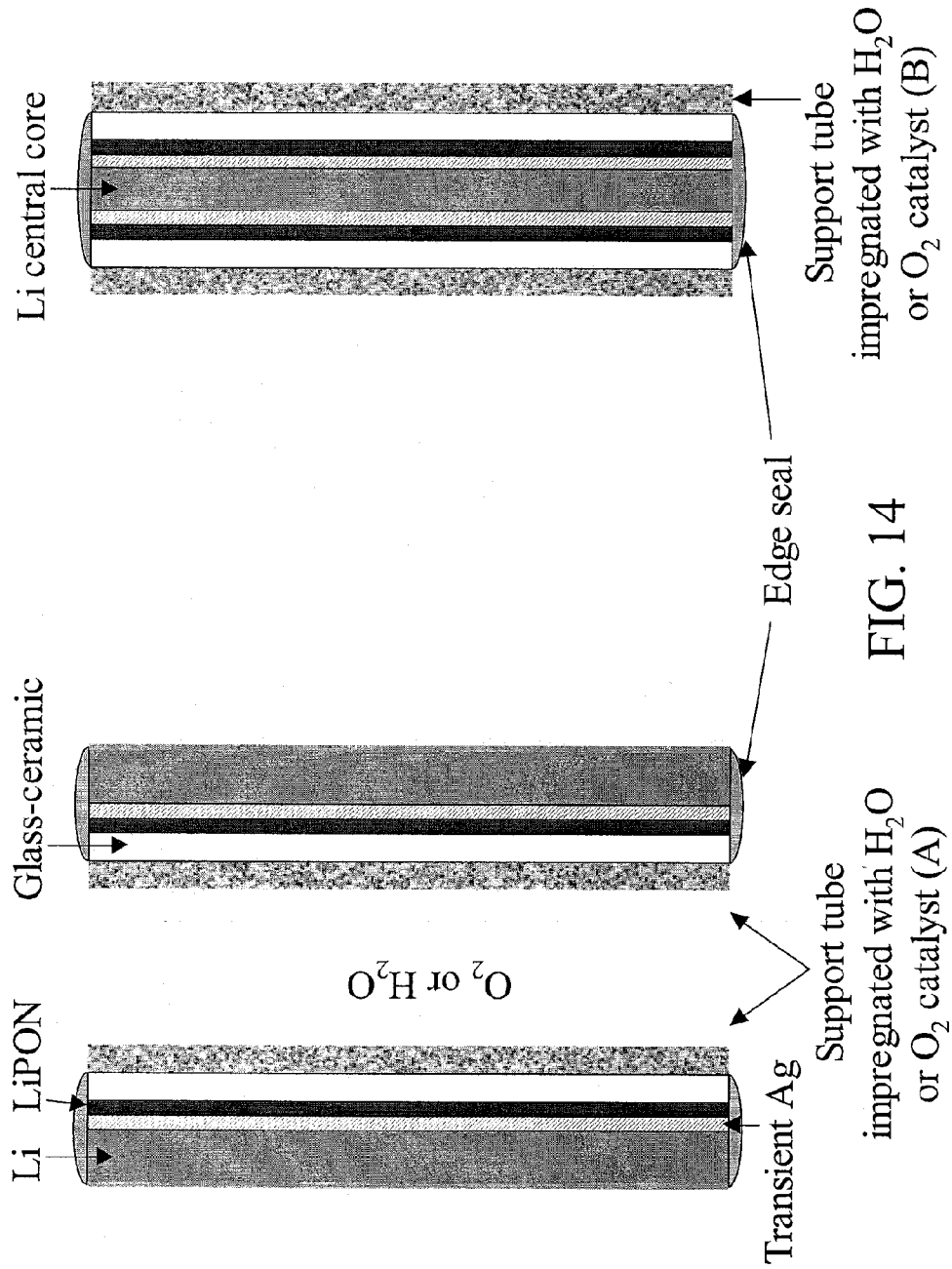
FIG. 14 illustrates a tubular construction embodiment of a Li/water or Li/air cell in accordance with the present invention.

FIG. 14 shows a tubular construction embodiment of a Li/water or Li/air cell in accordance with the present invention. For example a porous nickel tube could be used as a support. An ionically conductive glass, ceramic or glass-ceramic film such as described herein could be deposited by a variety of techniques, on either the outside (A) or inside (B) of the tube. The tube could be closed or open ended. For example, an open ended tube may be used, and an ionically conductive glass-ceramic plasma-sprayed onto the outer surface, followed by the lithium compatible first component material (e.g., LiPON), a bond coat (e.g., Ag), and a lithium electrode, and finally a copper foil and end seals. The tube could be suspended in seawater, and used as a high energy density battery. Depending on whether the lithium is outside of the tube, or inside the tube as a central core, the seawater (or air in the case of a Li/air cell) will flow through the center of the tube or around the tube, respectively.

Capillary Construction

Figure 15:
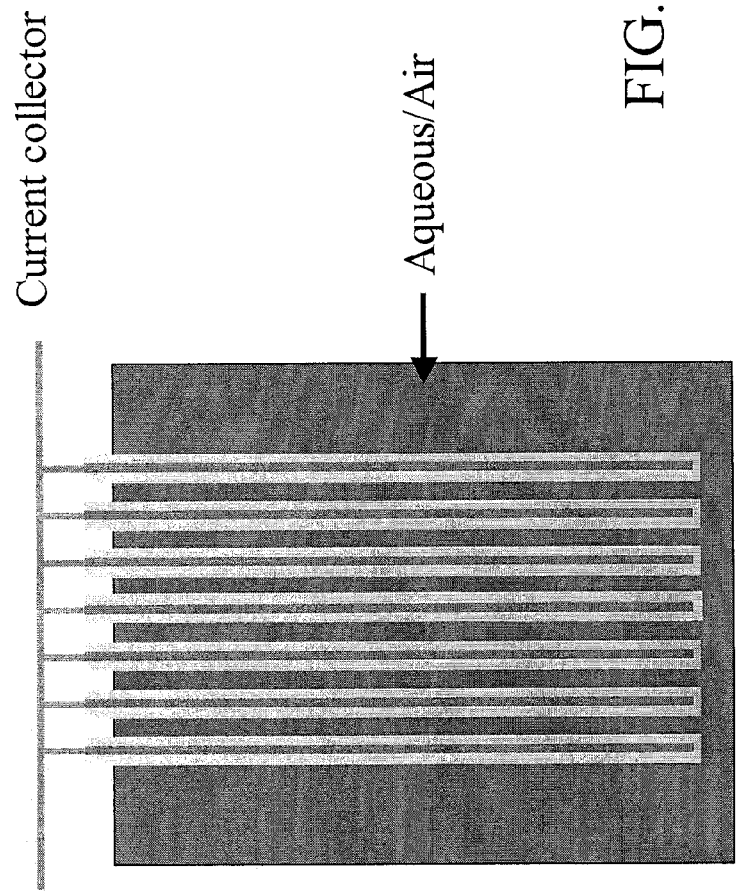
FIG. 15 illustrates a capillary construction embodiment of a Li/water or Li/air cell in accordance with the present invention.

FIG. 15 shows a capillary construction embodiment of a Li/water or Li/air cell in accordance with the present invention. In this approach, thin diameter glass, ceramic or glass-ceramic capillaries are blown from a protective membrane material. The inner (or outer) surface is coated with by the lithium compatible first component material (e.g., LiPON (Ag)), and molten lithium is wicked into the capillary to form a high surface area protected anode fiber. Individual fibers are then coated with the porous catalytic electronically conductive support material. The high surface area to volume ratio for such fibers allows for high rate applications. A number of such fibers can be connected in parallel to create a high power lithium/water battery, and combinations of parallel bundles can be connected in series to generate high voltage/high power batteries.

Alternative Embodiments

A number of other rechargeable lithium/aqueous chemistries are possible in accordance with the present invention. Some examples of these are:

Lithium-Nickel Battery

The nickel electrode, NiOOH, is well known to those skilled in the art, and has been used commercially for many years in rechargeable nickel/cadmium batteries, and more recently in rechargeable nickel/metal hydride batteries.

Anode reaction: $Li=Li^++e^-$

Cathode reaction: $NiOOH+H_2O+e^-=Ni(OH)_2+OH^-$

Cell reaction: $Li+NiOOH+H_2O=Ni(OH)_2+LiOH$

The nickel electrode is highly reversible, and the combination of a protected Li anode with a NiOOH cathode results in a high energy density, high cycle life battery.

Lithium-Silver Battery

The silver electrode, AgO, is also well known commercially in the Ag/Zn battery; a high rate battery used largely by the military.

Anode reaction: $Li=Li^++e^-$

Cathode reaction: $AgO+H_2O+2e^-=Ag+2OH^-$

Cell reaction: $4Li+2AgO+2H2O=4LiOH+2Ag$

The combination of a lithium anode and silver cathode results in a high rate, rechargeable battery.

Further, a variety of new aqueous battery chemistries enabled by the present invention can result from the combination of protected lithium anodes with transition metal oxides such as iron oxide, lead oxide, manganese oxide and others.

EXAMPLES

The following examples provide details illustrating advantageous properties of Li/water battery cells in accordance with the present invention. These examples are provided to exemplify and more clearly illustrate aspects of the present invention and are in no way intended to be limiting.

Example 1

Li/Water Cell

A series of experiments were performed in which the commercial ionically conductive glass-ceramic from OHARA Corporation described above was used as the outer layer (second composite layer) of a protective membrane against the aqueous environment of the electrolyte and cathode (water). These metal oxide Li conductors are stable in aqueous environments, but are unstable to lithium metal. In order to protect the OHARA membrane against metallic lithium, LiPON was used. The OHARA plates were in the range of 0.3 to 1 mm in thickness. The LiPON coating was in the range of 0.1 to 0.5 microns in thickness, and was deposited onto the OHARA plate by RF sputtering.

On top of the LiPON coating, a thin coating of Ag was formed by vacuum evaporation to prevent the reaction of hot evaporated lithium with the LiPON film. The Ag films were in the range of 200 to 1000 Å in thickness. LiPON can react with highly reactive Li from the vapor phase during Li vacuum deposition. Vacuum deposition of a thin film of Ag, Al, Sn or other Li alloy-forming metal onto the glass-ceramic surface can prevent the reaction LiPON surface with Li. The thickness of this metal film is from 50 Å to 10000 Å, preferably, from 100 Å to 1000 Å. In addition to protection of the first layer material against reaction with Li, a Li alloy-forming metal film can serve two more purposes. In some cases after formation the first layer material the vacuum needs to be broken in order to transfer this material through the ambient or dry room atmosphere to the other chamber for Li deposition. The metal film can protect the first layer against reaction with components of this atmosphere. In addition, the Li alloy-forming metal can serve as a bonding layer for reaction bonding of Li to the first layer material. When lithium is evaporated onto this structure, the Ag is converted to Ag—Li and diffuses, at least in part, into the greater mass of deposited lithium.

Figure 16:
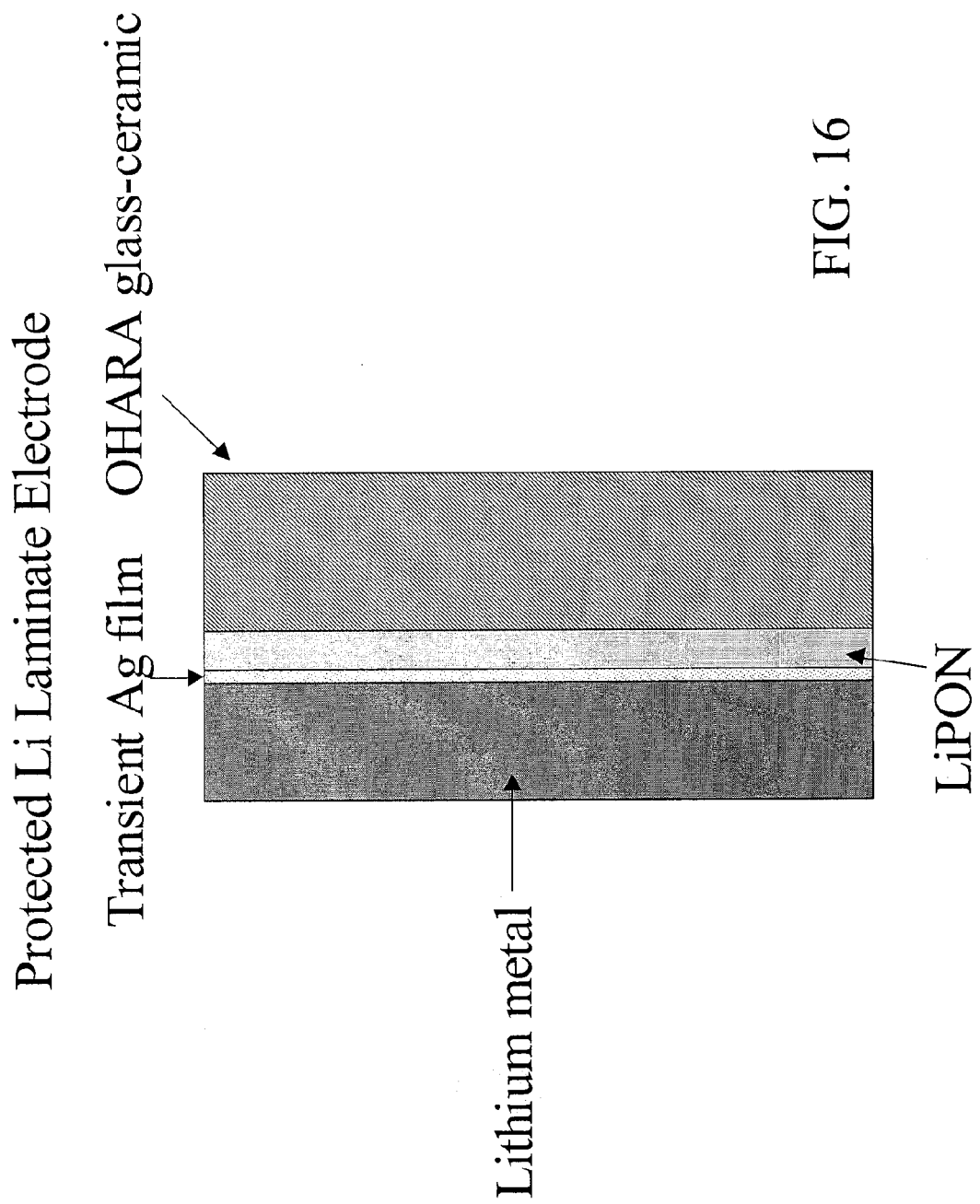
FIG. 16 illustrates a protected lithium electrode used as the cell of Example 1.
Figure 17:
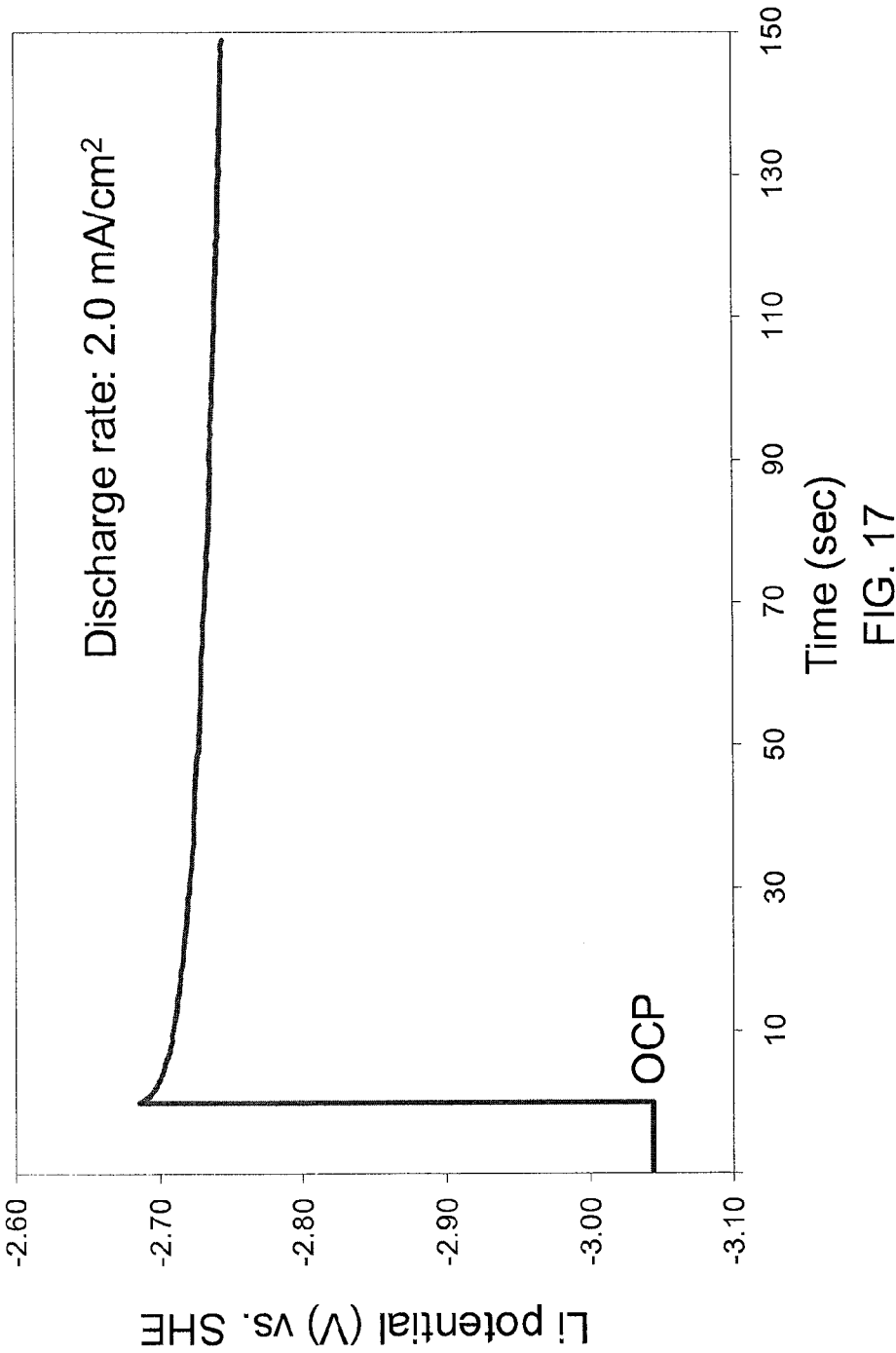
Figure 18:
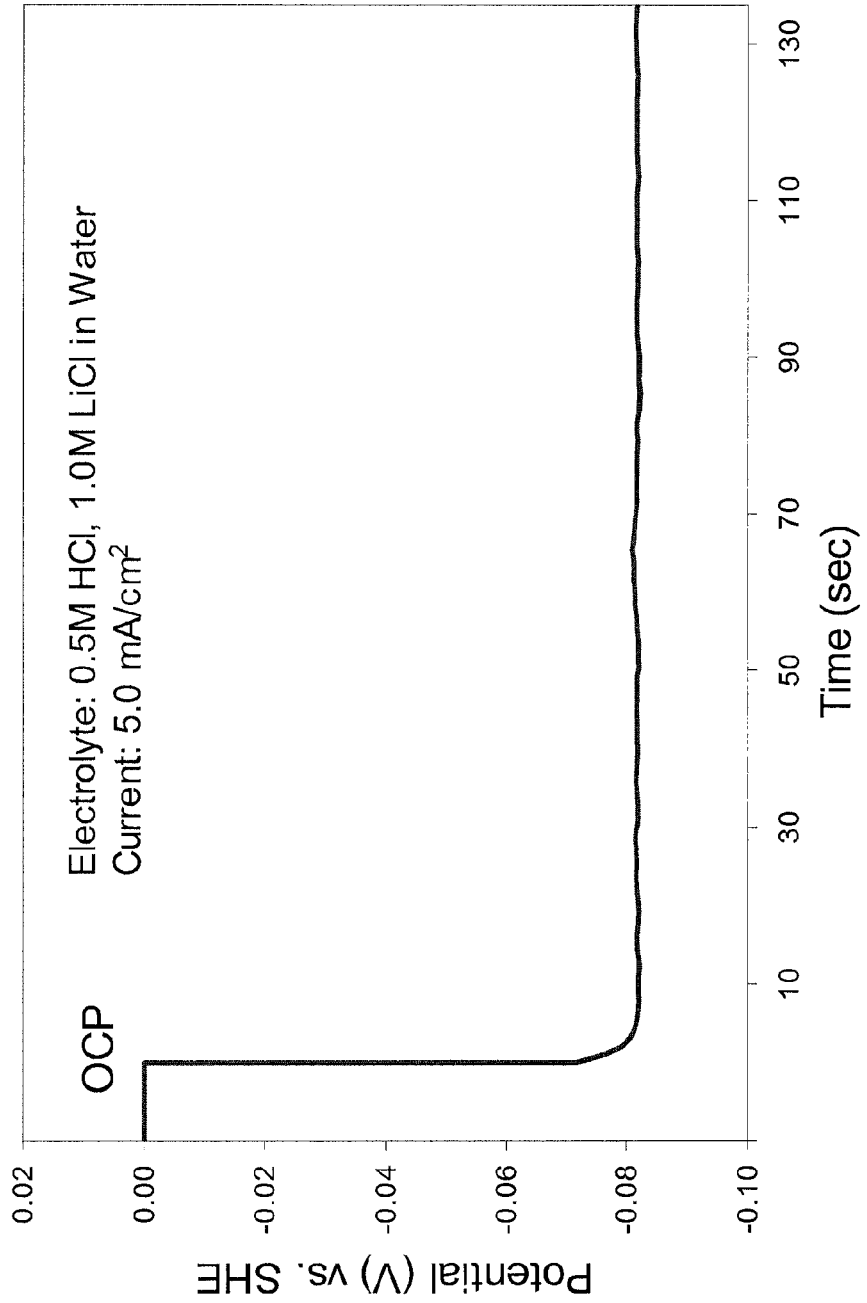

Following deposition of the Ag film, approximately 5 microns of lithium metal were evaporated onto the Ag film, creating a Li(Ag)/LiPON/OHARA protected lithium electrode. This protected lithium electrode is illustrated in FIG. 16. The protected electrode was fitted into an electrochemical cell by use of an o-ring such that the OHARA plate was exposed to an aqueous environment. In one case, the aqueous environment comprised a 0.5 M HCl+1.0 M LiCl electrolyte. A platinum counter electrode was used to facilitate hydrogen reduction when the battery circuit was completed. An Ag/AgCl reference electrode was used to control potentials of the Li anode and Pt cathode in the cell. Measured values were recalculated into potentials in the Standard Hydrogen Electrode (SHE) scale. An open circuit potential (OCP) of 3.05 volts corresponding closely to the thermodynamic potential difference between $Li/Li^+$ and $H_2/H^+$ in water was observed (FIG. 17). Under normal conditions, one could not observe this potential due to a significant shift of the Li electrode potential in the positive direction caused by intensive corrosion of lithium metal in water. Furthermore, there was no visual indication of reaction of the protected lithium electrode with the acidic aqueous environment, in particular, any gas evolution and/or Li dissolution. Remarkably, when the circuit was closed, hydrogen evolution was seen immediately at the Pt electrode, indicative of the anode and cathode electrode reactions in the cell, $2Li=2Li+2e^-$, and $2H^++2e^-=H_2$. The potential-time curves for electrochemical reactions of Li anodic dissolution and hydrogen cathodic evolution are presented in FIGS. 17 and 18, respectively. This is the first example known where a lithium/water battery has been operated in the absence of very large corrosion currents.

Figure 19:
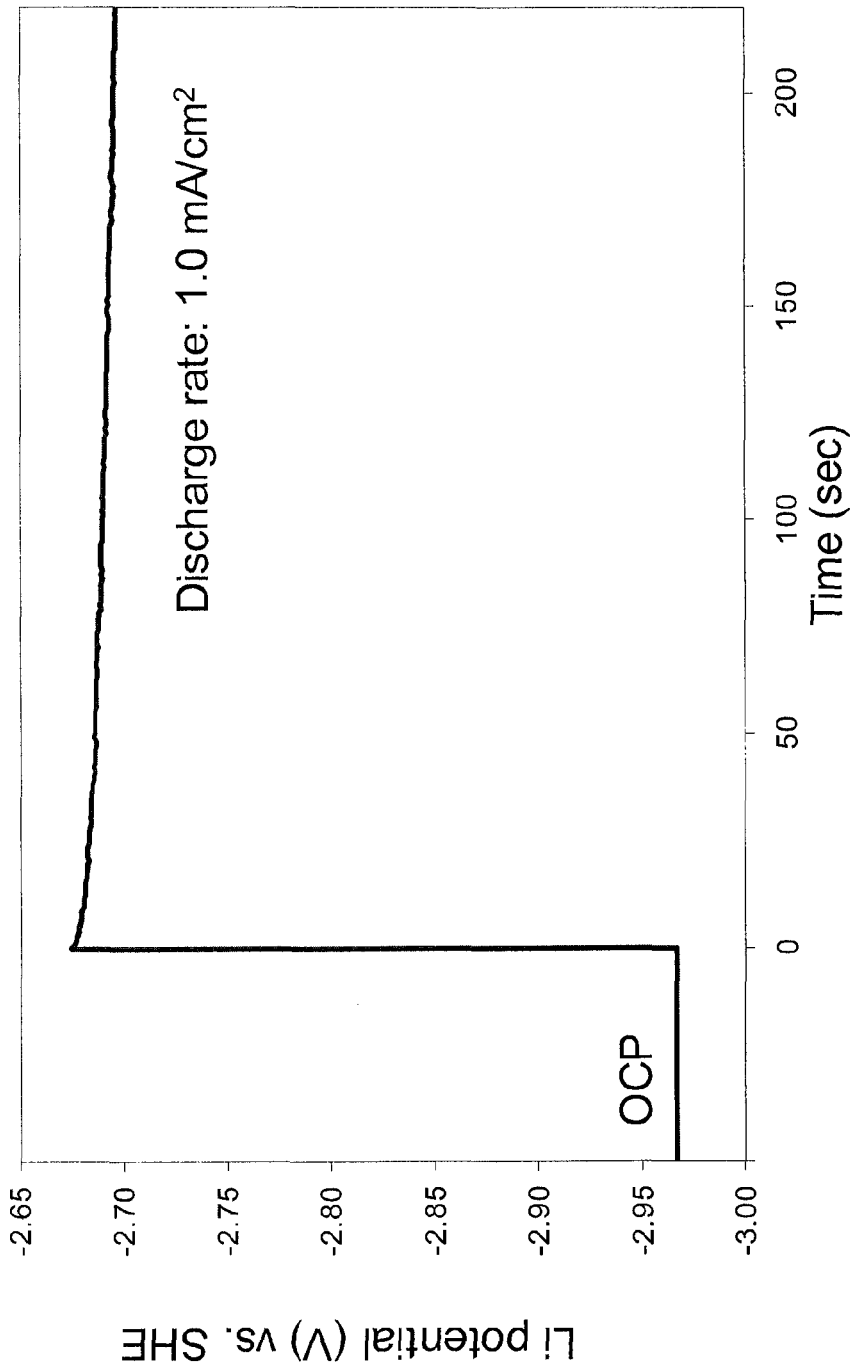
Figure 20:
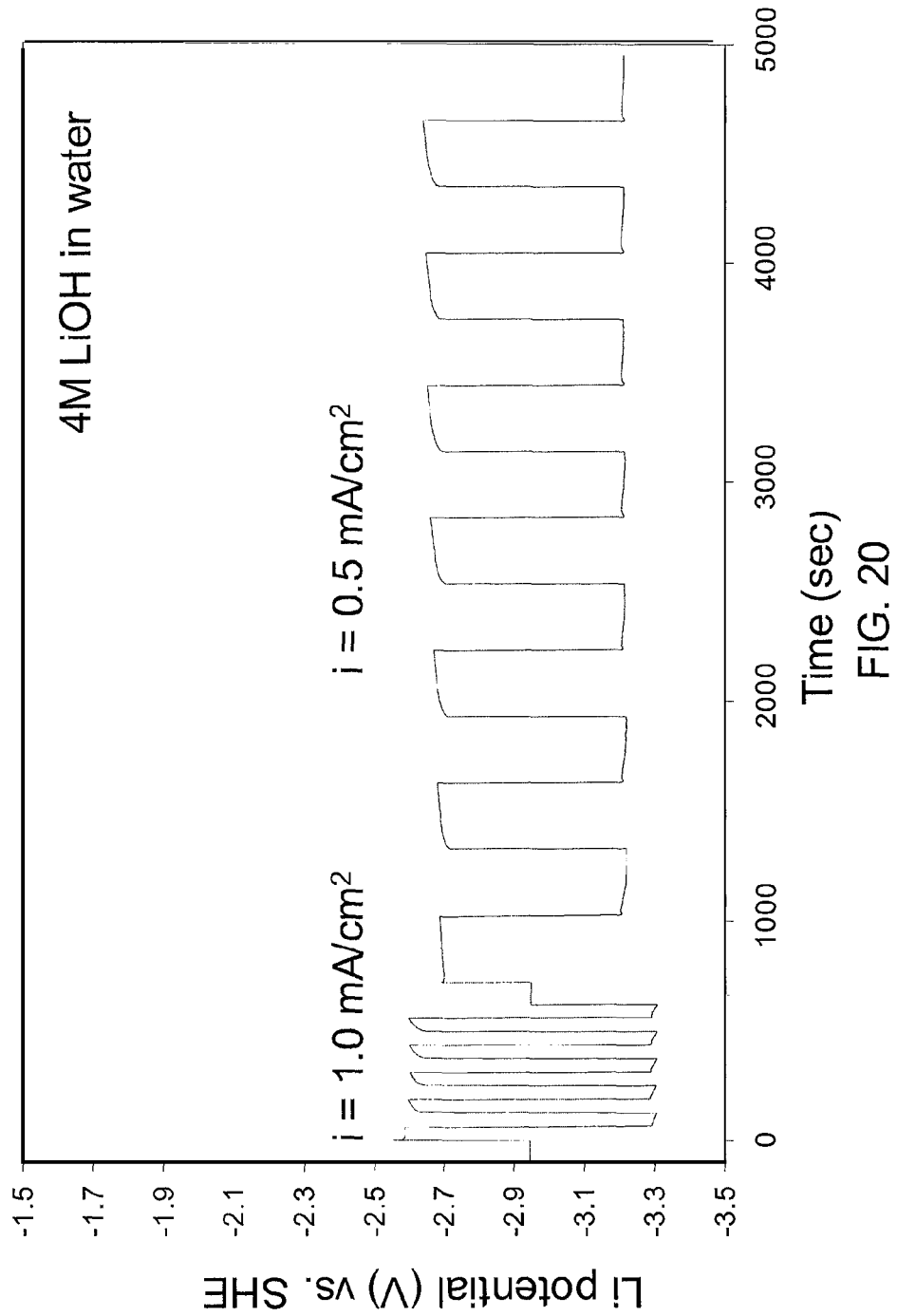
Figure 21:
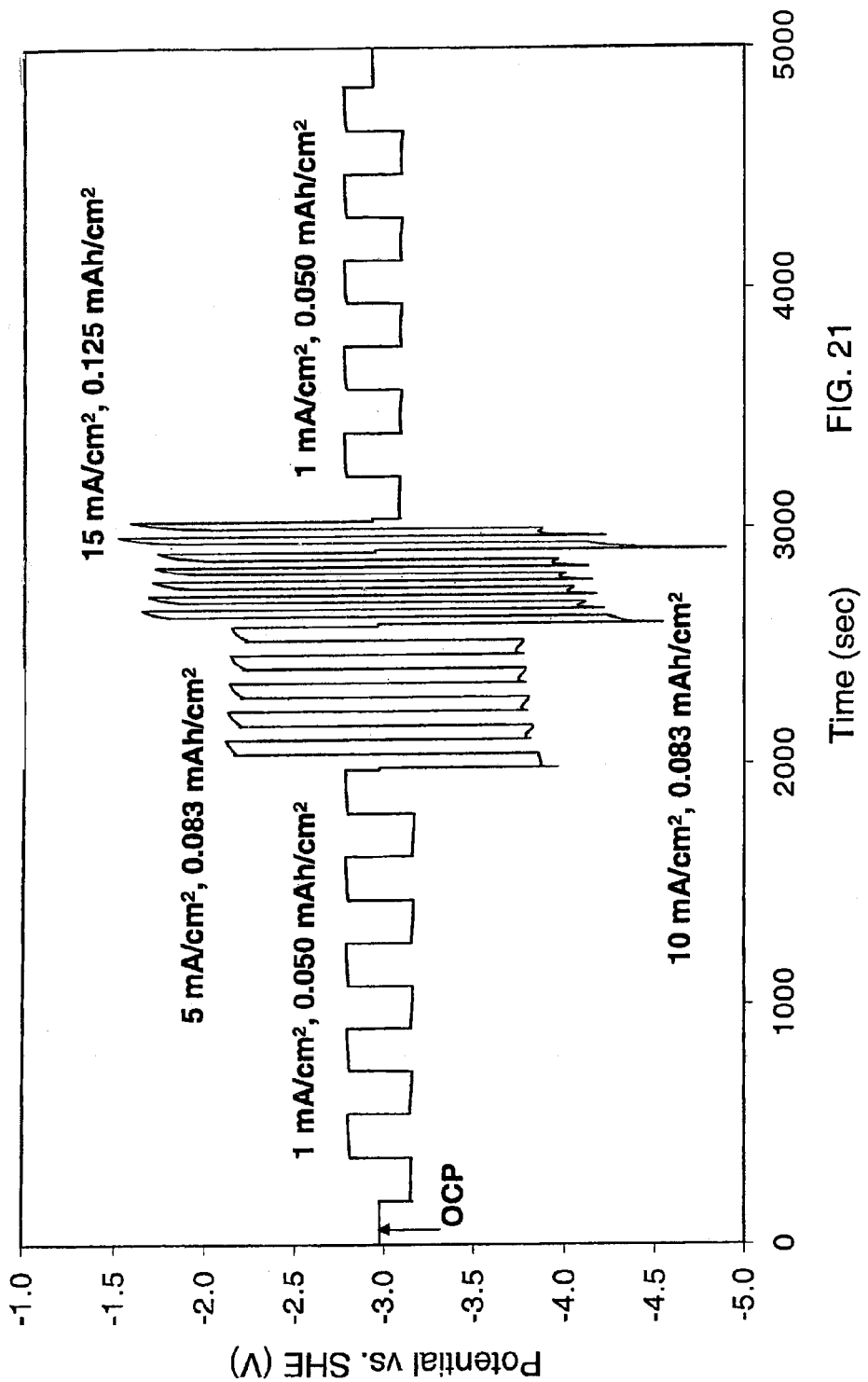

In another analogous experiment, the Li(Ag)/LiPON/OHARA electrode was used in an aqueous cell having 4 M LiOH electrolyte. In this cell Li also exhibited the correct OCP value close to the thermodynamic potential (FIG. 19). This cell was also discharged using a Pt counter electrode, which immediately evolved hydrogen on closing of the battery circuit. A small light emitting diode was placed in the Li/water battery circuit, and it immediately lit up on closing the circuit. Remarkably, reversible cycling of this battery was also possible (FIG. 20), actually plating metallic lithium from the aqueous environment during cell charge. Currents from 1.0 to 15 mA/cm² were used in the cycling experiments. As can be seen in FIG. 21, use of high current rates for cycling did not lead to destruction of the anode protective membrane or any irreversible changes in the cell behavior. This is the first known example where metallic lithium has been plated with high efficiency from an aqueous electrolyte.

Example 2

Li/Seawater Cell

Figure 22A:
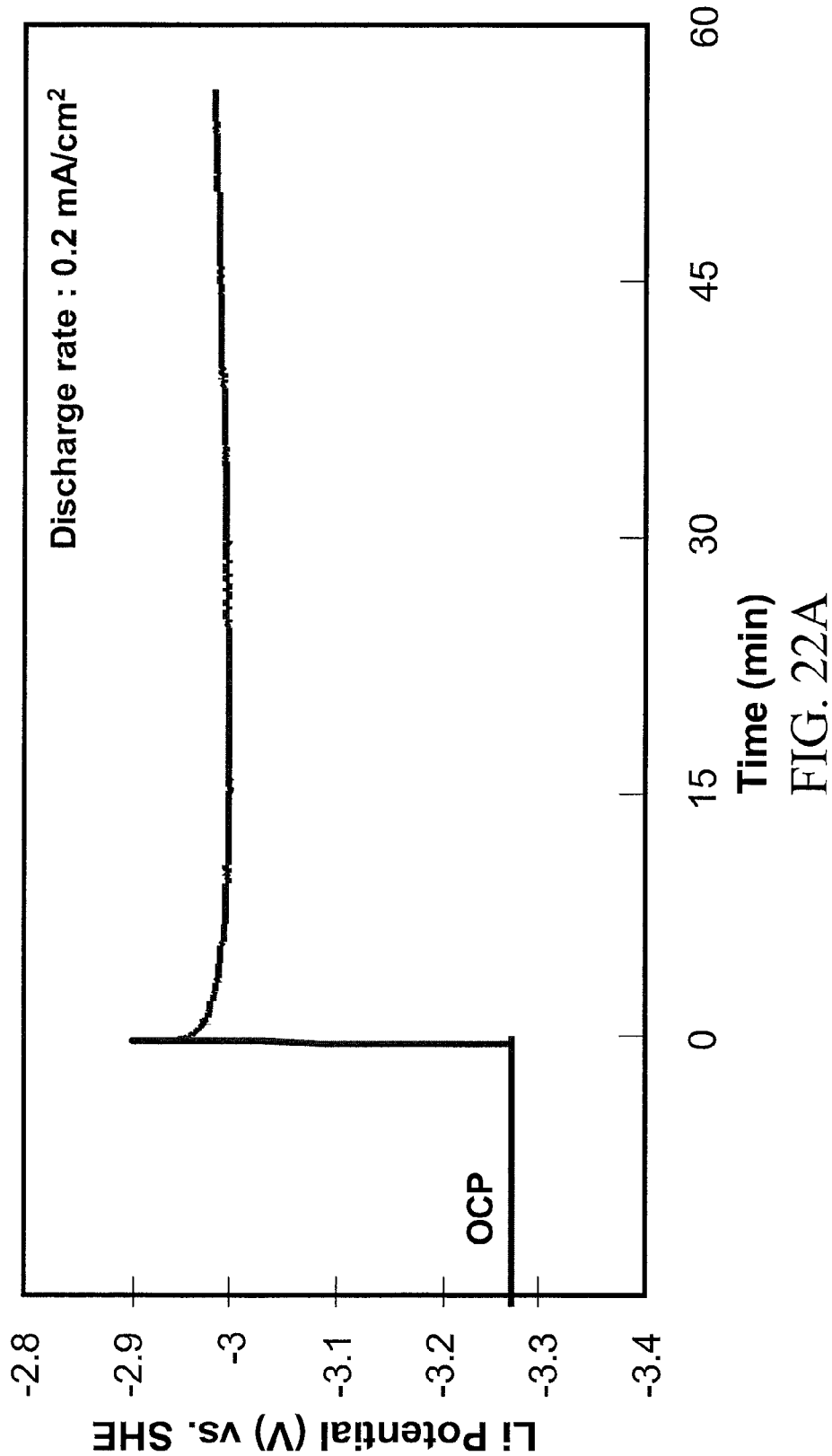

A lithium/sea (salt) water cell similar to the cell in the Example 1, was built. In this experiment, the Li(Ag)/LiPON/OHARA protected anode was used in a cell containing a "seawater" as an electrolyte. The seawater was prepared with 35 ppt of "Instant Ocean" from Aquarium Systems, Inc. The conductivity of the seawater used was determined to be 4.5 $10^{-2}$ S/cm. FIGS. 22A and B show discharge (potential-time) curves at discharge rates of 0.2 mA/cm² and 0.5 mA/cm², respectively. The results indicate an operational cell with good performance characteristics, including a stable discharge voltage. It should be emphasized that in all previous experiments using an unprotected Li anode in seawater utilization of Li was very poor and at low and moderate current densities similar to those used in this example such batteries could not be used at all due to the extremely high rate of Li corrosion in a seawater (over 19 A/cm²).

Example 3

Li/Seawater Cell with Large Capacity Anode

A lithium/sea (salt) water cell with a Pt wire cathode and a large capacity Li(Ag)/LiPON/glass-ceramic (OHARA Corp.) protected anode was built. Following deposition of the Ag film onto the LiPON on the OHARA plate, 50 um thick Li foil from Cyprus Foote Mineral Co. was pressed onto the Ag film to fabricate a thick protected Li anode. A Carver hydraulic press located in a dry room was used for the pressing operation. The applied pressure was around 800 kg/cm², and duration of pressing was 10 minutes. The Li surface was polished with a Tyvec fabric just before pressing onto the Ag film. The Ag film reacted with the Li foil forming a strong reaction bond. The seawater electrolyte composition was the same as in the previous example.

FIG. 23 shows a discharge (potential-time) curve at a discharge rate of 0.3 mA/cm². The cell exhibited long discharge. Discharge capacity delivered to the cut-off voltage of 2.0 V corresponded to the Li thickness over 20 μm. This amount of Li could be moved through the Li anode/aqueous electrolyte interface without destruction of the protective layers.

Example 4

Cell with Protected Li Electrode in Aqueous Electrolyte Containing Hydrogen Peroxide as a Dissolved Oxidant A Lithium/Hydrogen Peroxide cell was built with the Li(Ag)/LiPON/OHARA plate protected anode similar to one used in the previous example. Electrolyte was 1M solution of phosphoric acid ($H_3PO_4$) in water with addition of 5% hydrogen peroxide ($H_2O_2$) by weight. The volume of the electrolyte in the cell was 500 ml. A gold cathode for hydrogen peroxide reduction was made by vacuum coating of both sides of a carbon fiber paper (35 um thick from Lydall Technical Papers, Rochester, N.Y.) with an approximately 3 um thick Au layer.

Figure 24:
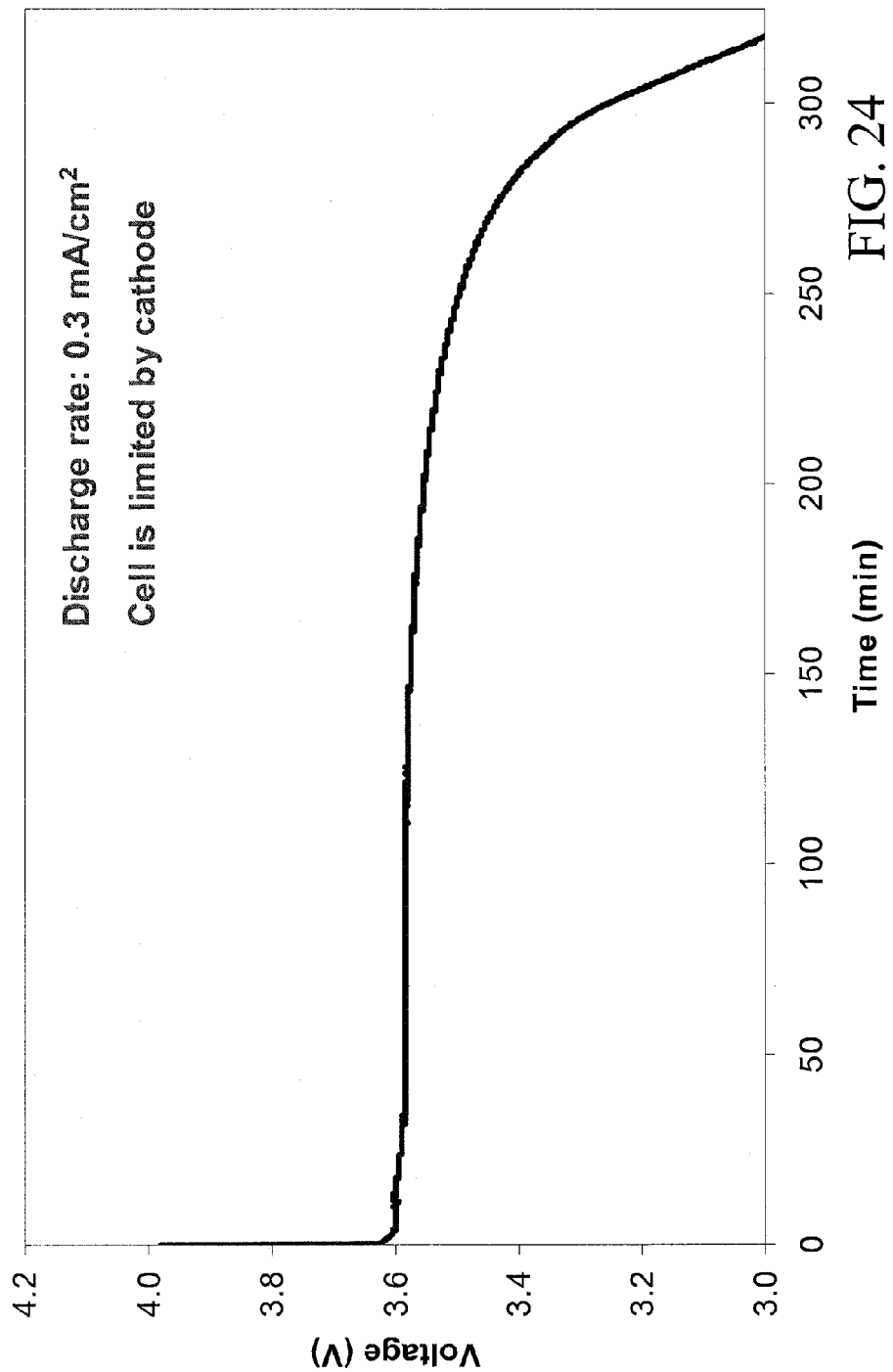

FIG. 24 shows a discharge (potential-time) curve for a discharge rate of 0.3 mA/cm². The open circuit potential value (OCP) for the cell was close to 4.0 V. The cell exhibited a flat discharge potential of approximately 3.6 V.

The overall theoretical cell reaction for the $Li/H_2O_2$ in an acidic medium is

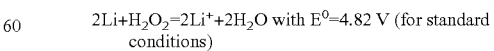
$2Li+H_2O_2=2Li^++2H_2O$ with $E^0=4.82$ V (for standard conditions)

Experimentally measured OCP values were lower than the theoretical value due to decomposition of hydrogen peroxide to water and oxygen on the cathode surface. As a result, not only hydrogen peroxide, but also oxygen as well could be reduced on the cathode surface leading to decrease in the OCP and the closed cell potential. Improvements in the cathode structure and use of a cell with flow of electrolyte having dissolved hydrogen peroxide should significantly improve overall cell characteristics. At the same time, the experimental results clearly demonstrate that using the protected Li anode and a strong oxidant soluble in water we can build a high energy power source with a very high Li efficiency at low and moderate current rates.

It should be pointed out that acidic electrolytes containing $H_2O_2$ cannot be directly used with unprotected Li anode in $Li/H_2O_2$ cells due to very high rate of Li corrosion and therefore, low Li efficiency.

Example 5

Li/Air Cell with Neutral Electrolyte

A series of experiments were performed whereby a commercial ionically conductive glass-ceramic from OHARA Corporation, was used as the outer membrane (second composite layer) against the protic corrosive environment. These metal oxide Li conductors are stable in aqueous environments, but are unstable to lithium metal. In order to protect the OHARA membrane against metallic lithium, a variety of materials could be used including LiPON, $Cu_3N$, SnNx, $Li_3N$, $Li_3P$, and metal halides. In this experiment, LiPON was used to protect the OHARA plate against reaction with Li. The OHARA plates were in the range of 0.2 to 0.3 mm in thickness. The LiPON coating was in the range of 0.2 to 0.9 microns in thickness, and deposited onto the OHARA plate by RF sputtering.

On top of the LiPON coating, a thin Ag film was sputter deposited. This was done to avoid the reaction of hot evaporated lithium with the LiPON film. The Ag film was in the range of 200 to 1000 Å in thickness. LiPON can react with highly reactive Li from the vapor phase during Li vacuum deposition. Vacuum deposition of a thin film of Ag, Al, Sn or other Li alloy-forming metal onto the glass-ceramic surface can prevent the reaction LiPON surface with Li. The thickness of this metal film is from 50 Å to 10000 Å, preferably, from 100 Å to 1000 Å.

Following deposition of the Ag film, approximately 5 microns of lithium metal were evaporated onto the Ag film, creating a Li(Ag)/LiPON/OHARA protected anode. The protected anode was fitted into an electrochemical cell by use of an o-ring such that the OHARA plate was exposed to the aqueous electrolyte environment.

The electrolyte used in this Li/air cell with protected anode was 0.5 M $NH_4Cl$+0.5 M LiCl. Zirconia cloth from Zircar Products, Inc. was put onto the OHARA plate and filled with the electrolyte. A volume of the electrolyte was approximately 0.2 ml. An air electrode made for commercial Zn/Air batteries was used as a cathode in this experimental Li/Air cell.

Figure 25:
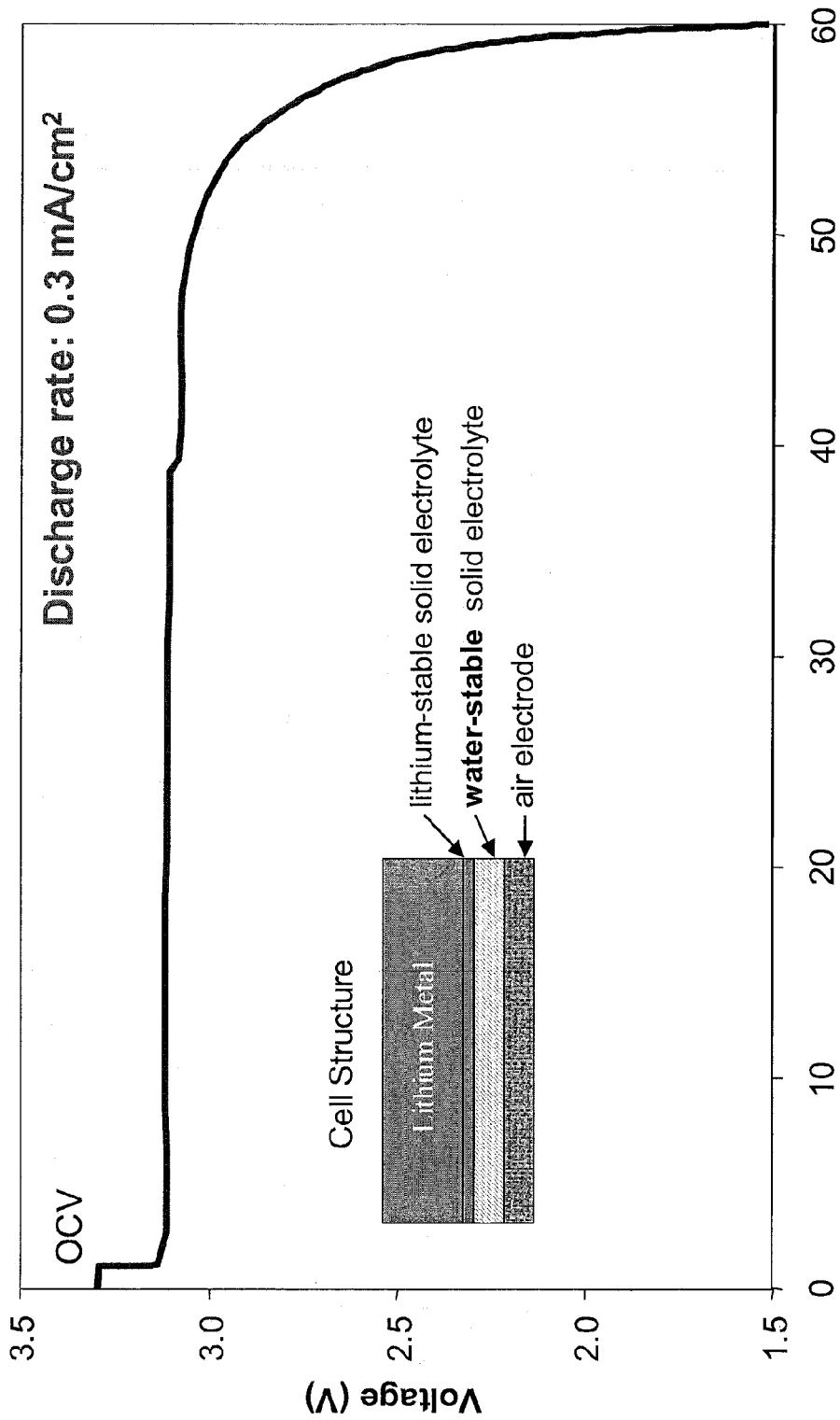

An open circuit potential of 3.25 was observed for this cell. FIG. 25 shows discharge (potential-time) curve at discharge rate of 0.3 mA/cm². The cell exhibited discharge voltage of approximately 3.1 V for about 1.0 hr (about 3.0 mAh/cm²). This result shows that good performance can be achieved for Li/air cells with protected Li anode and an electrolyte that does not contain KOH, which is normally employed in existing metal/Air batteries. KOH slows down corrosion of the metal (e.g., Zn), but draws $CO_2$ into the cell which causes damaging carbonization. As a result, conventional metal/air batteries have limited shelf-life. The Li/air cell described and tested herein is free from negative effect of electrolyte carbonization typical for existing metal/air batteries.

Example 6

Li/Air Cell with Large Capacity Anode

A lithium/air cell was built with an air cathode similar to that used in Example 5, but with a Li(Ag)/LiPON/OHARA plate protected anode having much higher capacity. The electrolyte used in this Li/air cell with protected anode comprised 0.5 M LiOH. Following deposition of the Ag film onto the LiPON on the OHARA plate, 120 um thick Li foil from Cyprus Foote Mineral Co. was pressed onto the Ag film to fabricate a thick protected Li anode. A Carver hydraulic press located in a dry room was used for the pressing operation. The applied pressure was around 800 kg/cm², and duration of pressing was 10 minutes. The Li surface was polished with a Tyvec fabric just before pressing onto the Ag film. The Ag film reacted with the Li foil forming a strong reaction bond.

Figure 26:
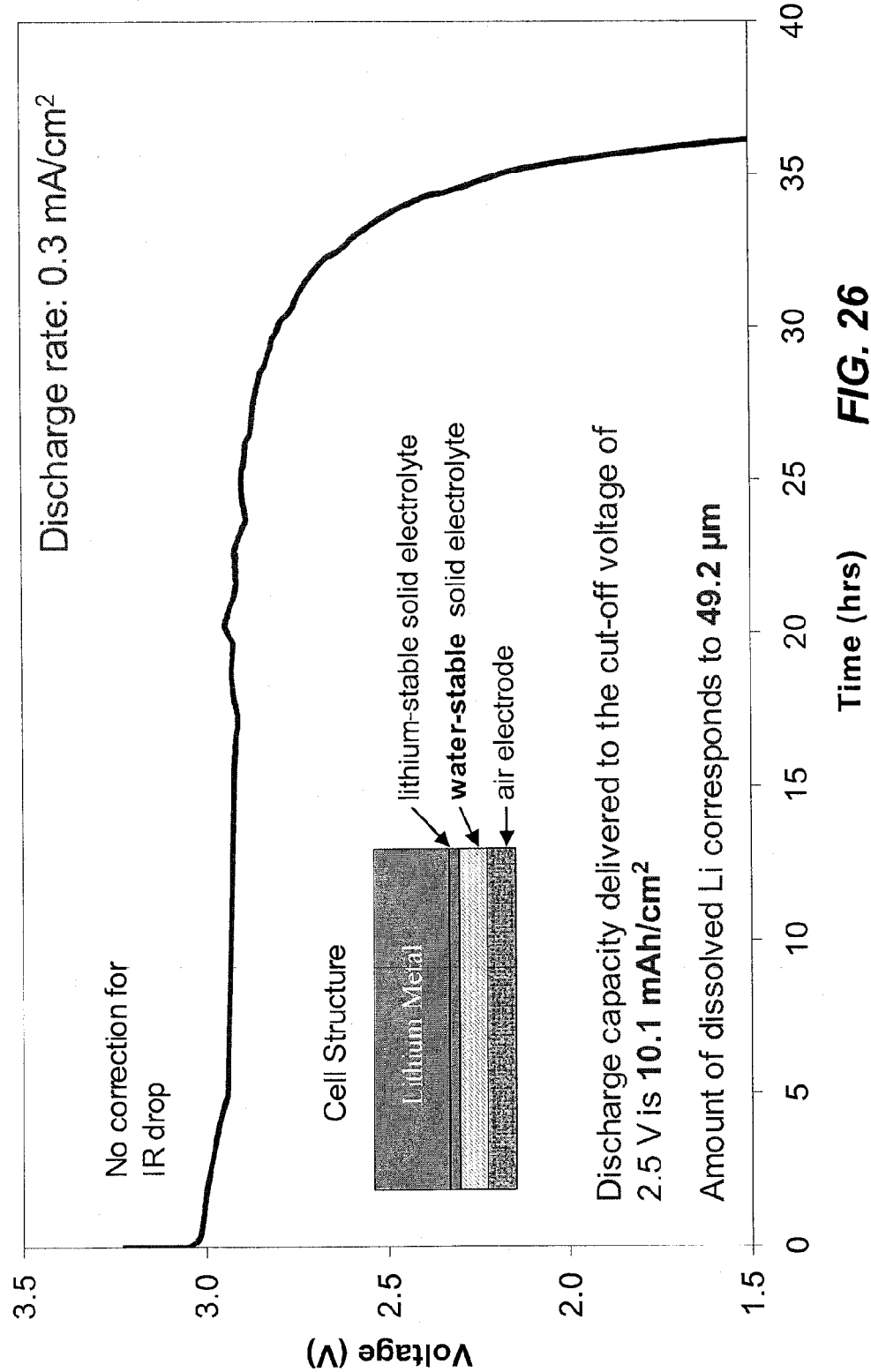

FIG. 26 shows a discharge (potential-time) curve at discharge rate of 0.3 mA/cm². The cell exhibited long discharge with a high average discharge voltage of 2.9 V. Discharge capacity delivered to the cut-off voltage of 2.5 V was more than 10 mAh/cm². Remarkably, this large amount of Li corresponding to the Li thickness over 49 μm could be moved through the Li anode/aqueous electrolyte interface without destruction of the protective layers.

Example 7

Cycling of Li/Air Cell with Protected Li Anode

A series of experiments were performed in which a commercial ionically conductive glass-ceramic from OHARA Corporation, was used as the outer (second) layer of a composite laminate protective layer against the protic corrosive environment. These metal oxide Li conductors are stable in aqueous environments, but are unstable to lithium metal. In order to protect the OHARA membrane against metallic lithium, a variety of materials could be used including LiPON, $Cu_3N$, SnNx, $Li_3N$, $Li_3P$, and metal halides. In the following experiments LiPON was used to protect the OHARA plate against reaction with Li. The OHARA plates were in the range of 0.2 to 0.3 mm in thickness. The LiPON coating was in the range of 0.2 to 0.9 microns in thickness, and was deposited onto the OHARA plate by RF magnetron sputtering.

On top of the LiPON coating, a thin Ag film was sputter deposited. This was done to avoid the reaction of hot evaporated lithium with the LiPON film. The Ag films were in the range of 200 to 1000 Å in thickness. LiPON can react with highly reactive Li from the vapor phase during Li vacuum deposition. Vacuum deposition of a thin film of Ag, Al, Sn or other Li alloy-forming metal onto the glass-ceramic surface can prevent the reaction LiPON surface with Li. The thickness of this metal film is from 50 Å to 10000 Å, preferably, from 100 Å to 1000 Å. In addition to protection of the first layer material against reaction with Li, a Li alloy-forming metal film can serve two more purposes. In some cases after formation the first layer material the vacuum needs to be broken in order to transfer this material through the ambient or dry room atmosphere to the other chamber for Li deposition. The metal film can protect the first layer against reaction with components of this atmosphere. In addition, the Li alloy-forming metal can serve as a bonding layer for reaction bonding of Li to the first layer material. When lithium is deposited onto this structure, the Ag is converted to Ag—Li and diffuses, at least in part, into the greater mass of deposited lithium.

Following deposition of the Ag film, approximately 5 microns of lithium metal were evaporated onto the Ag film, creating a Li(Ag)/LiPON/OHARA protected anode. The protected anode was fitted into an electrochemical cell by use of an o-ring such that the OHARA plate was exposed to the aqueous environment.

The electrolyte used in this Li/air cell with protected anode was comprised of 1 M LiOH. The volume of the electrolyte was approximately 0.2 ml. An air electrode from commercial Zn/Air batteries was used as a cathode in our experimental Li/Air cell.

Figure 27:
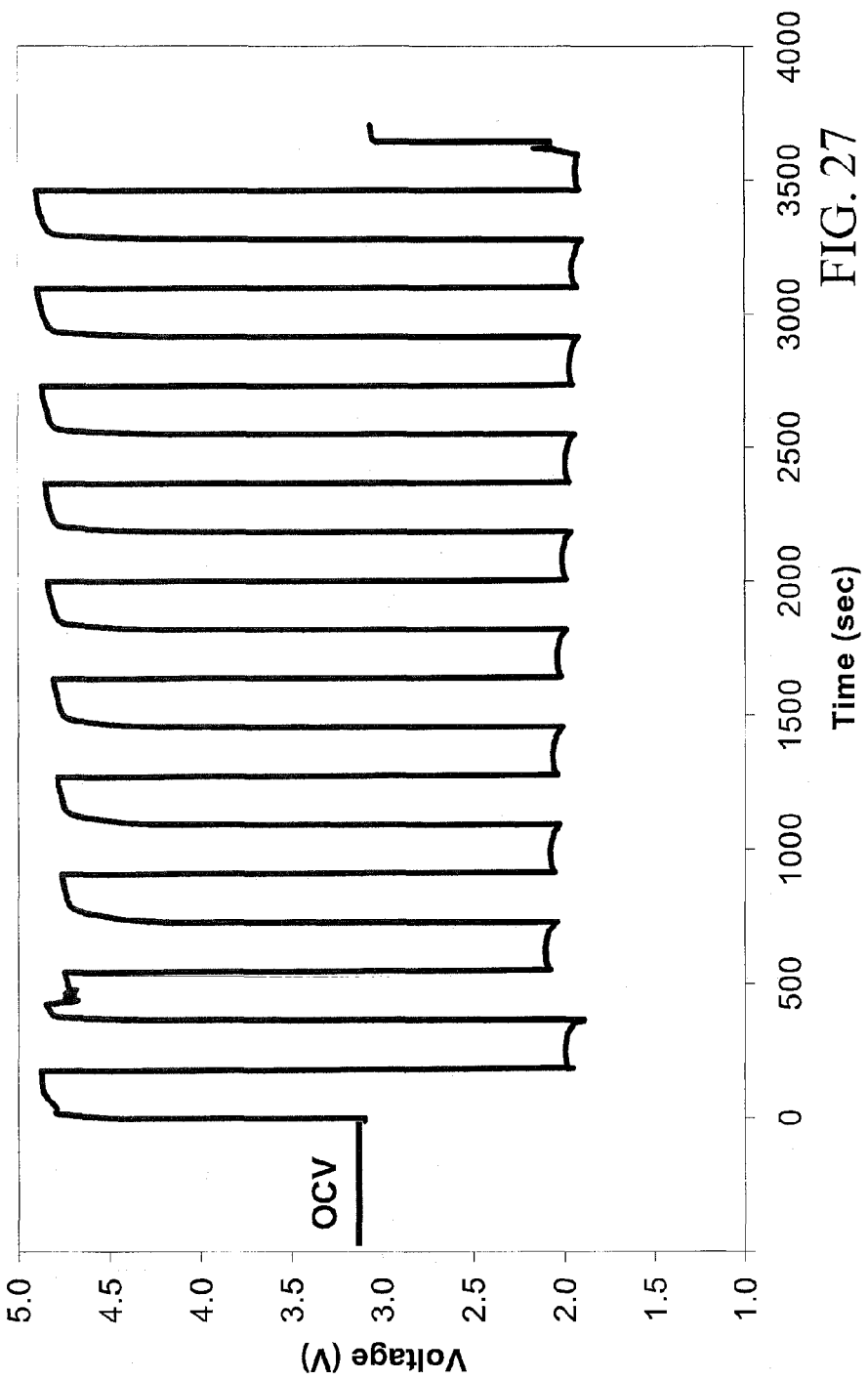

FIG. 27 shows discharge/charge potential-time curves at discharge/charge rate of 1.0 mA/cm$^2$. The duration of each discharge and charge was 3 minutes. Even though the air electrodes used in these experiments were designed for single discharge, the cell delivered 10 cycles without significant increase in electrode polarization. This result demonstrates that a protected Li anode Li/air cell in accordance with the present invention can work reversibly.

Conclusion

Although the foregoing invention has been described in some detail for purposes of clarity of understanding, it will be apparent that certain changes and modifications may be practiced within the scope of the appended claims. In particular, while the invention is primarily described with reference to a lithium metal anode, the anode may also be composed of any active metal, in particular, other alkali metals, such as sodium. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed is:

1. A method of making an electrochemical cell structure, the method comprising:
   tape-casting an inherently lithium ion conductive separator membrane selected from the group consisting of a glass, a ceramic and a glass-ceramic, the membrane having a first surface and a second surface; and
   assembling the tape-cast inherently lithium ion conductive separator membrane with a lithium-containing anode adjacent to the first surface;
   wherein the membrane effectively isolates the lithium-containing anode from an environment at the second surface of the membrane, while allowing transport of lithium ions across the membrane, the membrane having a lithium ion conductivity of at least $10^{-6}$ S/cm.

2. The method of claim 1, wherein the tape-cast inherently lithium ion conductive separator membrane is selected from the group consisting of a glass and a glass-ceramic.

3. The method of claim 1, wherein the tape-cast inherently lithium ion conductive separator membrane is a ceramic.

4. The method of claim 3, wherein following the tape-casting, the ceramic is fired to full density.

5. The method of claim 1, wherein the electrochemical cell structure further comprises a porous support structure on which the tape-cast inherently lithium ion conductive separator membrane is disposed.

6. An electrochemical cell structure, comprising:
   a tape-cast inherently lithium ion conductive separator membrane selected from the group consisting of a glass, a ceramic and a glass-ceramic, the membrane having a first surface and a second surface; and
   a lithium-containing anode on the first surface of the membrane;
   wherein the membrane effectively isolates the lithium-containing anode from an environment at the second surface of the membrane, while allowing transport of lithium ions across the membrane, the membrane having a lithium ion conductivity of at least $10^{-6}$ S/cm.

7. The electrochemical cell structure of claim 6, wherein the inherently lithium ion conductive separator membrane is selected from the group consisting of a glass and a glass-ceramic.

8. The electrochemical cell structure of claim 6, wherein the inherently lithium ion conductive separator membrane is a ceramic.

9. The electrochemical cell structure of claim 8, wherein the ceramic is dense.

10. The electrochemical cell structure of claim 6, wherein the electrochemical cell structure further comprises a porous support structure on which the tape-cast inherently lithium ion conductive separator membrane is disposed.

11. A battery cell comprising:
    a tape-cast inherently lithium ion conductive separator membrane selected from the group consisting of a glass, a ceramic and a glass-ceramic, the membrane having a first surface and a second surface;
    a lithium-containing anode on the first surface of the membrane; and
    a cathode environment comprising a cathode adjacent the second surface of the membrane;
    wherein the membrane effectively isolates the lithium-containing anode from the cathode environment, while allowing transport of lithium ions across the membrane, the membrane having a lithium ion conductivity of at least $10^{-6}$ S/cm.

12. The battery cell of claim 11, wherein the tape-cast inherently lithium ion conductive separator membrane is selected from the group consisting of a glass and a glass-ceramic.

13. The battery cell of claim 11, wherein the tape-cast inherently lithium ion conductive separator membrane is a ceramic.

14. The battery cell of claim 13, wherein the ceramic is dense.

15. The battery cell of claim 11, wherein the battery cell further comprises a porous support structure on which the tape-cast inherently lithium ion conductive separator membrane is disposed.

16. A method of making a lithium battery cell, the method comprising:
    tape-casting an inherently lithium ion conductive separator membrane selected from the group consisting of a glass, a ceramic and a glass-ceramic; and
    assembling the tape-cast inherently lithium ion conductive separator membrane-between an anode and a cathode;
    wherein the membrane allows transport of lithium ions, the membrane having lithium ion conductivity of at least $10^{-5}$ S/cm.

17. The method of claim 16, wherein the tape-cast inherently lithium ion conductive separator membrane is selected from the group consisting of a glass and a glass-ceramic.

18. The method of claim 16, wherein the tape-cast inherently lithium ion conductive separator membrane is a ceramic.

19. The method of claim 18, wherein the ceramic is dense.

20. The method of claim 16, wherein the battery cell further comprises a porous support structure on which the tape-cast inherently lithium ion conductive separator membrane is disposed.

21. A lithium battery cell, comprising:
- an anode;
- a cathode; and
- a tape-cast inherently lithium ion conductive separator membrane selected from the group consisting of a glass, a ceramic and a glass-ceramic, the tape-cast inherently lithium ion conductive separator membrane disposed between the anode and the cathode;
- wherein the membrane allows transport of lithium ions, the membrane having lithium ion conductivity of at least $10^{-5}$ S/cm.

22. The battery cell of claim 21, wherein the tape-cast inherently lithium ion conductive separator membrane is selected from the group consisting of a glass and a glass-ceramic.

23. The battery cell of claim 21, wherein the tape-cast inherently lithium ion conductive separator membrane is a ceramic.

24. The battery cell of claim 23, wherein the ceramic is dense.

25. The battery cell of claim 21, wherein the battery cell further comprises a porous support structure on which the tape-cast inherently lithium ion conductive separator membrane is disposed.

\* \* \* \* \*